United States Patent
Terry et al.

(10) Patent No.: US 11,301,632 B2
(45) Date of Patent: Apr. 12, 2022

(54) SYSTEMS AND METHODS FOR NATURAL LANGUAGE PROCESSING AND CLASSIFICATION

(71) Applicant: Conversica, Inc., Foster City, CA (US)

(72) Inventors: Alex Terry, Foster City, CA (US); Werner Koepf, Foster City, CA (US); James Harriger, Foster City, CA (US); Will Webb-Purkis, Foster City, CA (US); Joseph M. Silverbears, Foster City, CA (US); Macgregor S. Gainor, Foster City, CA (US); Ryan Ginstrom, Foster City, CA (US); Siddhartha Reddy Jonnalagadda, Foster City, CA (US)

(73) Assignee: CONVERSICA, INC., Foster City, CA (US)

( * ) Notice: Subject to any disclaimer, the term of this patent is extended or adjusted under 35 U.S.C. 154(b) by 961 days.

(21) Appl. No.: 16/019,382

(22) Filed: Jun. 26, 2018

(65) Prior Publication Data

US 2018/0373696 A1    Dec. 27, 2018

Related U.S. Application Data

(63) Continuation-in-part of application No. 14/604,594, filed on Jan. 23, 2015, now Pat. No. 10,803,479, and
(Continued)

(51) Int. Cl.
*G06N 20/00* (2019.01)
*G06F 40/289* (2020.01)
(Continued)

(52) U.S. Cl.
CPC ........ *G06F 40/289* (2020.01); *G06F 3/04812* (2013.01); *G06F 16/35* (2019.01);
(Continued)

(58) Field of Classification Search
None
See application file for complete search history.

(56) References Cited

U.S. PATENT DOCUMENTS

| 7,076,430 B1 | 7/2006 | Cosatto et al. |
| 7,275,083 B1 | 9/2007 | Seibel et al. |

(Continued)

FOREIGN PATENT DOCUMENTS

EP    3467755    4/2019

OTHER PUBLICATIONS

USPTO, ISA/US, "Notification of Transmittal of the ISR and the WO of the International Searching Authority or The Declaration", dated May 6, 2016, 12 pages.

(Continued)

*Primary Examiner* — David R Vincent
(74) *Attorney, Agent, or Firm* — Kang S. Lim

(57) ABSTRACT

Systems and methods for natural language processing and classification are provided. In some embodiments, the systems and methods include a communication editor dashboard which receives the message, performs natural language processing to divide the message into component parts. The system displays the message in a first pane with each of the component parts overlaid with a different color, and displaying in a second pane the insights, the confidence scores associated with each insight, the sentiment and the actions. In another embodiment, the systems and methods include combining outputs from multiple machine learned AI models into a unified output. In another embodiment, the systems and methods include responding to simple question using natural language processing.

20 Claims, 24 Drawing Sheets

Related U.S. Application Data a continuation-in-part of application No. 14/604,602, filed on Jan. 23, 2015, now Pat. No. 11,042,910, and a continuation-in-part of application No. 14/604,610, filed on Jan. 23, 2015, now Pat. No. 10,026,037.

(60) Provisional application No. 62/561,194, filed on Sep. 20, 2017.

(51) Int. Cl.

| | | |
|---|---|---|
| *G06F 3/04812* | (2022.01) | |
| *G06F 16/35* | (2019.01) | |
| *G06N 5/00* | (2006.01) | |
| *G06N 5/04* | (2006.01) | |
| *G06N 5/02* | (2006.01) | |
| *G06N 20/20* | (2019.01) | |
| *G06F 40/30* | (2020.01) | |
| *G06N 3/04* | (2006.01) | |
| *G06N 7/00* | (2006.01) | |

(52) U.S. Cl.
CPC ............ *G06F 40/30* (2020.01); *G06N 5/003* (2013.01); *G06N 5/022* (2013.01); *G06N 5/041* (2013.01); *G06N 20/00* (2019.01); *G06N 20/20* (2019.01); *G06F 2203/04804* (2013.01); *G06N 3/0445* (2013.01); *G06N 3/0454* (2013.01); *G06N 5/025* (2013.01); *G06N 7/005* (2013.01)

(56) References Cited

U.S. PATENT DOCUMENTS

| | | |
|---|---|---|
| 7,512,580 B2 | 3/2009 | Ronnewinkel |
| 8,000,973 B2 | 8/2011 | Williams et al. |
| 8,099,316 B2 | 1/2012 | Moukas et al. |
| 8,364,467 B1 | 1/2013 | Bowman et al. |
| 8,666,742 B2 | 3/2014 | Detlef et al. |
| 8,694,355 B2 | 4/2014 | Buiet et al. |
| 8,700,543 B2 | 4/2014 | Glickman |
| 8,738,739 B2 | 5/2014 | Makar |
| 8,767,948 B1 | 7/2014 | Riahi |
| 8,787,553 B2 | 7/2014 | Fan et al. |
| 9,258,423 B1 | 2/2016 | Beall |
| 9,367,814 B1 | 6/2016 | Lewis et al. |
| 9,552,591 B2 | 1/2017 | Barak et al. |
| 9,805,018 B1 | 10/2017 | Richfield |
| 10,043,205 B2 | 8/2018 | Gupta et al. |
| 2005/0080613 A1 | 4/2005 | Colledge et al. |
| 2007/0036334 A1 | 2/2007 | Culbertson et al. |
| 2007/0129993 A1 | 6/2007 | Alvin |
| 2007/0233692 A1 | 10/2007 | Lisa et al. |
| 2008/0071606 A1 | 3/2008 | Whiteley et al. |
| 2009/0048859 A1 | 2/2009 | McCarthy et al. |
| 2010/0010885 A1 | 1/2010 | Hill et al. |
| 2011/0060643 A1 | 3/2011 | Davis et al. |
| 2012/0191546 A1 | 7/2012 | Phelan |
| 2012/0245925 A1 | 9/2012 | Guha |
| 2013/0046531 A1 | 2/2013 | Chandramouli |
| 2013/0086188 A1 | 4/2013 | Mays et al. |
| 2013/0297442 A1 | 11/2013 | Simons et al. |
| 2013/0346067 A1 | 12/2013 | Bhatt |
| 2014/0122407 A1 | 5/2014 | Duan |
| 2014/0149161 A1 | 5/2014 | Hedges |
| 2014/0195354 A1 | 7/2014 | Pokonosky |
| 2014/0222854 A1 | 8/2014 | Lee et al. |
| 2014/0278958 A1 | 9/2014 | Nukala et al. |
| 2014/0279050 A1 | 9/2014 | Makar et al. |
| 2014/0280184 A1 | 9/2014 | Swaminathan et al. |
| 2014/0280225 A1 | 9/2014 | Southern-Boukerrou |
| 2014/0280623 A1 | 9/2014 | Duan |
| 2014/0288920 A1 | 9/2014 | Proux |
| 2015/0019305 A1 | 1/2015 | Gorawala |
| 2015/0100364 A1 | 4/2015 | Friedman et al. |
| 2015/0195406 A1* | 7/2015 | Dwyer .................. G10L 15/26 379/265.07 |
| 2015/0348548 A1 | 12/2015 | Piernot |
| 2015/0350144 A1 | 12/2015 | Zeng et al. |
| 2015/0365527 A1 | 12/2015 | Chakravarthy |
| 2016/0071117 A1 | 3/2016 | Duncan |
| 2016/0071132 A1* | 3/2016 | Roozen ............. G06Q 30/0203 705/7.32 |
| 2016/0125364 A1 | 5/2016 | Field et al. |
| 2016/0217500 A1 | 7/2016 | Brigham et al. |
| 2018/0109482 A1* | 4/2018 | De ......................... H04L 51/08 |

OTHER PUBLICATIONS

USPTO, ISA/US, "Notification of Transmittal of the ISR and the WO of the International Searching Authority or The Declaration", dated Feb. 5, 2019, 10 pages.

Quote Wizard & AVA.AI Unveil Automated Virtual Assistant for Insurance Agents Jun. 20, 2014. Insurance Weekly News (Year: 2014).

Artificial Intelligence-Based Email Conversations Shown to Quadruple Lead Engagement for more Effective Sales and Marketing Campigns Jun. 5, 2014, NASDAQ OMX's News Release Distribution Channel (Year: 2014).

Artificial Intelligence Comes to Your Email; Artificial Life Releases New Intelligent Email Module, Mar. 27, 2002, Business Wire (Year: 2002).

* cited by examiner

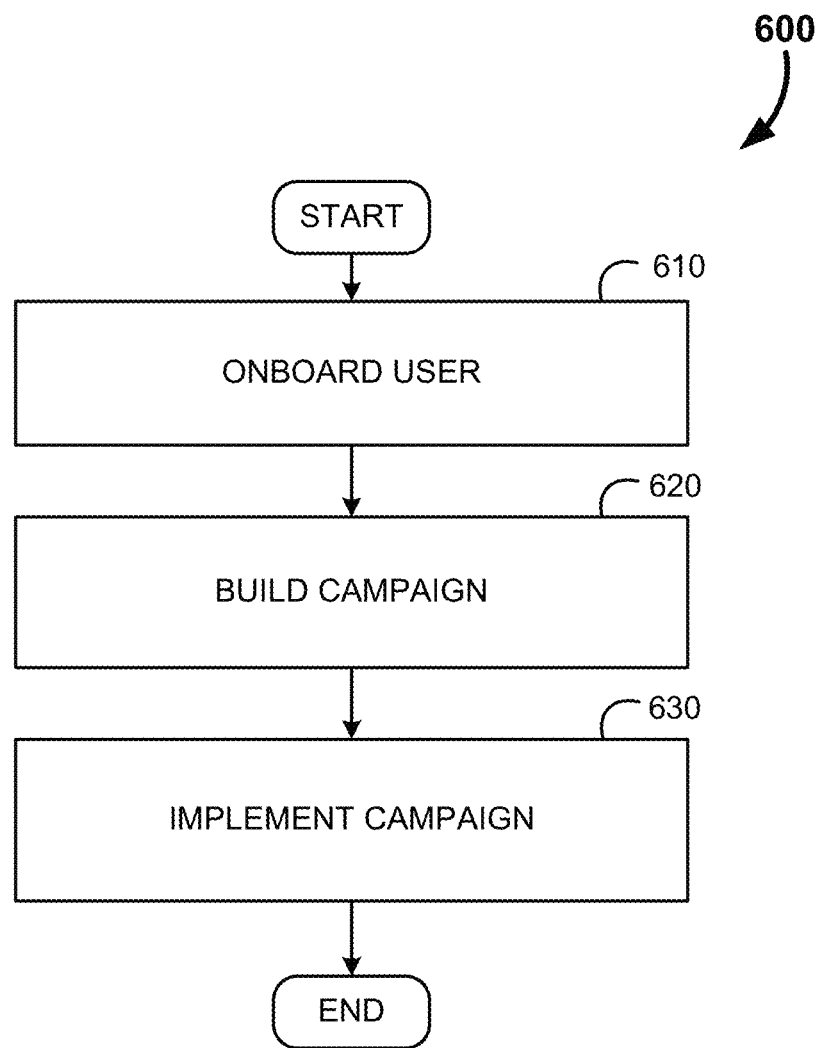

Top Insights
1. Interested in learning more (94%)
2.
Other Derived Attributes
Message primary language: English
Author a fluent [English] speaker? 75%
Edu level est. 16 (scale 0-26)
Sentiment analysis: 91 (scale of 0-100 with 0 being negative)
Behavioral analysis: xxx
3$^{rd}$ Party Data
Zip code est. 94104
Top Actions
1. Continue messaging, qualify template <20127>

Top Insights
1. Proposed meeting date (92%)
2. Provide phone number (97%)
Other Derived Attributes
Message primary language: English
Author a fluent [English] speaker? 97%
Edu level est. 16 (scale 0-26)
Sentiment analysis: 88 (scale of 0-100 with 0 being negative)
Behavioral analysis: xxx Top Actions:
1. Continue messaging, intro Rep template <30198>
2. Schedule mtg. template <40015>

Fig. 19

SYSTEMS AND METHODS FOR NATURAL LANGUAGE PROCESSING AND CLASSIFICATION

CROSS REFERENCE TO RELATED APPLICATIONS

This continuation-in-part application claims the benefit of U.S. application entitled "Systems and Methods for Configuring Knowledge Sets and AI Algorithms for Automated Message Exchanges," U.S. application Ser. No. 14/604,610, filed in the USPTO on Jan. 23, 2015, recently allowed.

This application is also a non-provisional and claims the benefit of U.S. provisional application entitled "Systems and Methods for Natural Language Processing and Classification," U.S. application Ser. No. 62/561,194, filed in the USPTO on Sep. 20, 2017.

This continuation-in-part application also claims the benefit of U.S. application entitled "Systems and Methods for Processing Message Exchanges Using Artificial Intelligence," U.S. application Ser. No. 14/604,602, filed in the USPTO on Jan. 23, 2015, pending.

This continuation-in-part application additionally claims the benefit of U.S. application entitled "Systems and Methods for Management of Automated Dynamic Messaging," U.S. application Ser. No. 14/604,594, filed in the USPTO on Jan. 23, 2015, pending.

All of the above-referenced applications are incorporated herein in their entirety by this reference.

BACKGROUND

The present invention relates to systems and methods for improved natural language processing and classification of documents, primarily in the context of the generation and management of a dynamic messaging campaign. Such systems and methods provide marketers and sales people more efficient tools for client management and outreach, and also improve computer functioning as it relates to processing documents for meaning. In turn, such system and methods enable more productive business conversations. An example scenario discussed is sales where the system enhances sales activity, increased profits, and more efficient allocation of sales resources.

Currently, organizations in a business such as sales, marketing, customer service, customer success, recruiting, and HR departments operate both passively and actively. For example, passive sales activity includes providing a general offer for sale of products and/or services to the public and waiting for customers to make the initial contact. In contrast, active sales techniques involve the seller reaching out to consumers directly. The benefit of active approaches is that the actors, such as customers, can be targeted more effectively, and decisions may be more effectively influenced. Active sales techniques (and similar techniques in other business organizations) may include unsolicited "cold calls", or may include following up with "leads" who have responded to some advertisement, or who has been purchased from a marketing firm. While cold calling and similar techniques have their place, continuing a dialog with an established actor, such as a sales lead, is by far the most targeted and effective means of business activity in sales and other organizations.

Active techniques have been around for as long as commerce has been occurring. For example, sellers traditionally hawked their wares via in-person solicitation or fliers. Indeed, to this day, advertisements are routinely sent via postal mail to consumers. When available these mailed advertisements include degrees of customization, such as inclusion of the actor's (in this example, receiver's) name printed on the advertisement.

With the advancement of technology, so too have active techniques evolved. With the widespread use of telephones, calls by actors belonging to business organizations became a staple of active techniques in sales, marketing and other business functions. For example, this initially took the form of sales people "cold calling" prospective customers. "Robocalls" have become more popular recently due to the ability to reach much wider audiences with very little additional resource expenditure.

As the interne has become a more prominent feature of commerce, on-line ads and email campaigns have joined the arsenal of business departments as ways to engage actors such as a potential consumer. For example, email marketing in particular has become a very effective and frequently utilized means of reaching customers. For large actor populations, these emails are typically minimally tailored advertisements. For smaller actor groups, individual emails may still be crafted by actors from business organizations such as sales associates; however this activity (while more effective) is often very time consuming. Additionally, a business actor can usually only engage in a limited number of these correspondences without the use of contact management software.

As documented in our prior patents (U.S. application Ser. Nos. 14/604,594, 14/604,602 and 14/604,610), AI processing ability and knowledge sets have allowed for more, and more sophisticated, automation of such activities in a dynamic manner that appears to be human generated. This enables the far reach of a "robocall" style campaign for marketing and other activities, while still maintaining the effectiveness or more traditional tailored outreach campaigns for business functions such as sales and marketing. However, with the access to more capable AI systems for marketing and other business functions such as those documented in previous patents identified above, there arises a need for users of such systems to cooperate more closely with the AI to get the best functionality out of these systems, and improve the AI's functioning. Likewise, these systems depend upon accurate and effective classification of documents to operate correctly. Without effective natural language processing, these automated engagement systems are stymied.

It is therefore apparent that an urgent need exists for advancements in the natural language processing and classification elements of a message response system that maximizes the ability to get the benefit of an individualized natural language correspondence through channels such as email, chat, sms and social media for business activities such as sales and marketing with the advantages of machine automation through accurate document classification.

SUMMARY

To achieve the foregoing and in accordance with the present invention, systems and methods for the natural language processing and classification are provided.

In some embodiments, the systems and methods include a communication editor dashboard which receives the message, performs natural language processing to divide the message into component parts. Each component part has a discrete meaning. The message is analyzed for sentiment, insights for the component parts, confidence for the insights, and generation of actions based on these insights. The system then displays the message in a first pane with each of the component parts overlaid with a different color, and displaying in a second pane the insights, the confidence scores associated with each insight, the sentiment and the actions.

In another embodiment, the systems and methods include combining outputs from multiple machine learned AI models into a unified output. This includes receiving feedback from multiple machine learned AI models. The feedback is a classification for a message processed using natural language processing. A scenario is also received for the message. A credibility score for each of the machine learned AI models is determined according to the scenario in a credibility matrix. A weight is applied to each of the machine learned AI models based on the credibility score. The scores are then averaged using these weights to generate the unified output.

In another embodiment, the systems and methods include responding to simple question using natural language processing. This includes receiving, from a campaign manager, a set of training questions linked to facts answering the associated training question. The facts are stored in a third party database. Each of the training questions is linked to a fundamental question category. A concept for a message is received from the machine learning AI model. The machine learning AI model utilize a dataset independent from the third party database. The concept for the message is referenced to the fundamental question categories, which causes the fact associated with the fundamental question category that the message concept references to be retrieved from the third party database. A response template for the fundamental question category that the message concept references to is also retrieved from the independent dataset, and populated with the fact. This final response can then be outputted.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 6 is an example flow diagram for a dynamic message campaign, in accordance with some embodiment;

FIG. 19 is an example illustration of a transparency output information associated with the message exchange between the message response system and a lead, in accordance with some embodiment;

DETAILED DESCRIPTION

Figure 1:
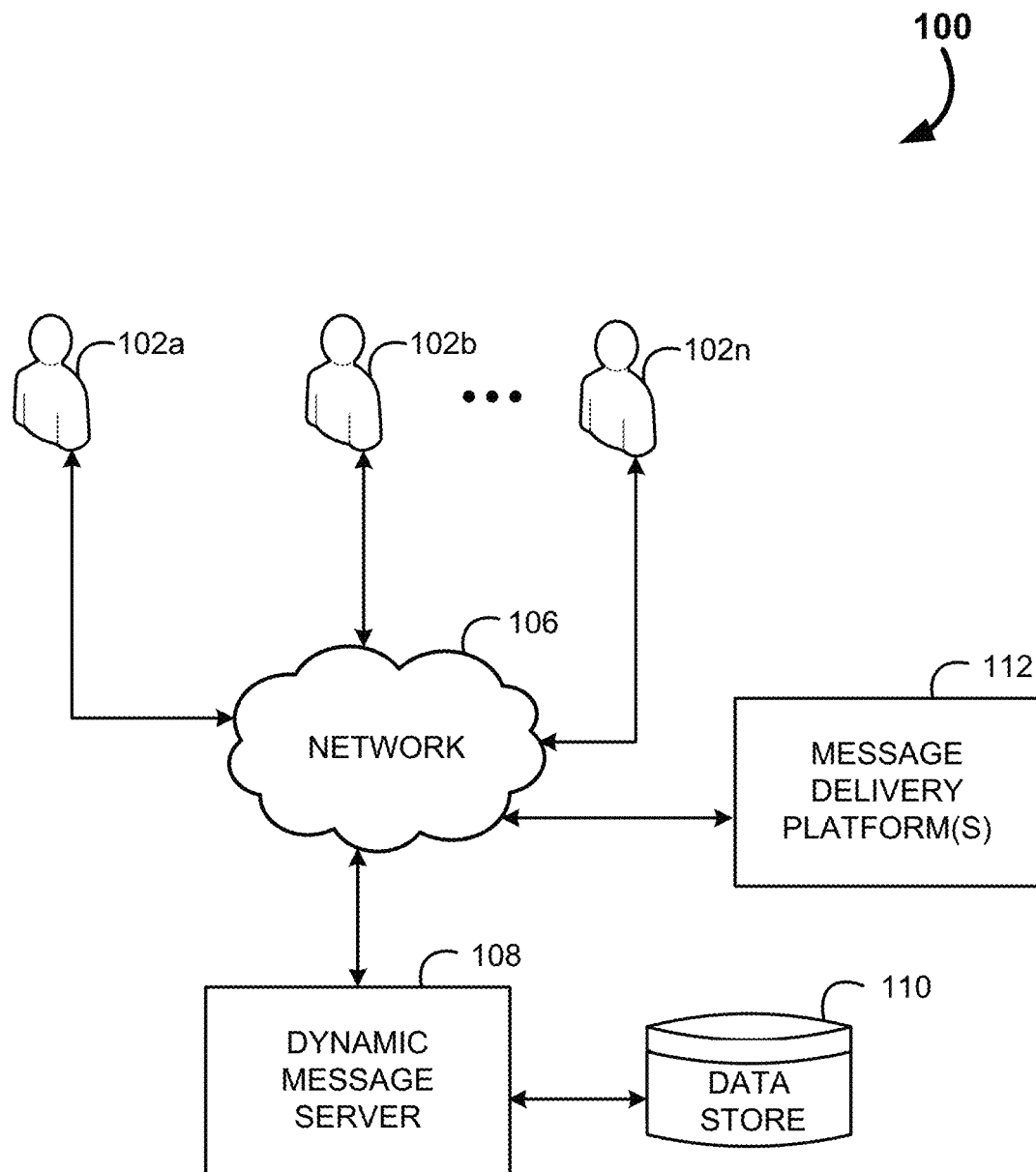
FIG. 1 is an example logical diagram of a system for generation and implementation of messaging campaigns, in accordance with some embodiment.

The present invention will now be described in detail with reference to several embodiments thereof as illustrated in the accompanying drawings. In the following description, numerous specific details are set forth to provide a thorough understanding of embodiments of the present invention. It will be apparent, however, to one skilled in the art, that embodiments may be practiced without some or all of these specific details. In other instances, well known process steps and/or structures have not been described in detail to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to cooperation between business actors such as human operators and AI systems. While such systems and methods may be utilized with any AI system, such cooperation systems particularly excel in AI systems relating to the generation of automated messaging for marketing and other sales functions. While the following disclosure is applicable for other combinations, we will focus upon mechanisms of cooperation between human operators and AI marketing systems as an example, to demonstrate the context within which the cooperation system excels.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Definitions

The following systems and methods for dynamic messaging a campaign relies upon an interplay of user interaction, and sophisticates artificial intelligence (AI) processing of received messages. The goal of the message campaign it to enable a logical dialog exchange with a recipient, where the recipient is not necessarily aware that they are communicating with an automated machine as opposed to a human actor. This may be most efficiently performed via a written dialog, such as email, text messaging, chat, etc. However, it is entirely possible that given advancement in audio and video processing, it may be entirely possible to have the dialog include audio or video components as well.

To effectuate such an exchange, an AI system is employed within an AI platform within the messaging system to process the responses and generate conclusions regarding the exchange. These conclusions include calculating the context of a document, insights, sentiment and confidence for the conclusions. Given that these terms are not readily familiar outside of the field of natural language processing, a series of definitions are provided to clarify the terminology:

accuracy—the quantitative evaluation of how reliable and comprehensive the system classifications are. We formally define it as the sum of all instances of inputs where the system classification is correct as annotated by a business actor (sales person, linguistic annotator, etc.) divided by the total number of instances.

(AI) algorithm—a method employed to calculate the weight of a document in a particular category.

aspect—a specific AI algorithm. Example: Naive Bayes, Sentiment.

attempt—a single message in a series for a campaign.

AI Trainer—term for the tool used to classify a document that the aspects were not confident scoring.

campaign—a set of possible messaging designed to be sent out to a lead over the course of a conversation depending on the receipt and classification of responses (or lack thereof).

categorization—the process in which ideas and objects are recognized, differentiated, and understood, generally into categories.

category—possible answers to the insight they belong to. Example: Insight: "Continue messaging?" has categories: "Stop" and "Continue".

classification—another word for categorization.

confidence—a calculated probability that the categorization is correct.

context—a collection of documents that have some commonality. Example: "all documents collected from asking 'What is a good phone number?'.", "messages sent from customers in a chat with Bill in customer service".

document—a set of words in a specific order used to convey a meaning.

Hard-rule—an AI algorithm that dictates a category based on a heuristic match involving tokens, regular expression patterns and discourse-level intents and entity classifications.

Hard-rule term—an example of a string in the response that is used by the Hard-rule aspect as part of the overall heuristics.

insight—a collection of categories used to answer some question about a document. Example: "What does this person mean?", "How does this person feel?", "Should we keep emailing this person?"

knowledge set—a set of tokens with their associated category weights used by an aspect during classification.

actor—a person or another entity like an AI system that represents a person who is placed into the system at a certain time for a certain purpose. For example, a lead is placed in our system using for sales conversion under a predefined campaign Alternate terms for 'actor' may include "lead", "contact", "business actor" or the like depending upon use case.

actor (event) history—the notable information for an actor coming into the system, messages sent to that actor, responses received and alerts sent out, in the chronological order of their occurrences.

ngram—denotes the number of words used to make a token. Example: token "yes it is" is a tri-gram or an ngram of 3.

normalization—removing characters/tokens to reduce the complexity of the document without changing the accuracy of classifications.

question—an inquiry included in a message designed to limit the response to a subset of the target language.

response—the document received after sending a message to a lead.

(response) actions—tasks that the system can carry out for a given lead based on the classification of the response.

sentiment classifier—an AI algorithm that is used to gauge how strongly a category expresses itself in a document.

series—a subset of a campaign designed to be sent out until a response is received for that subset of messages.

Based on the classification of the response, the system may continue to another series of messaging in that same campaign.

score—a set of probabilities or a positive number between 0 and 1 associated with the set of classifications made by the different aspects for different insights.

The (AI) Platform—the system that allows interaction with, setup, score, and modify the AI algorithms as need be. This also includes the code, databases and servers used for this specific purpose.

term—one or more words used as a single unit to correlate to a category through assigning a weight.

training set—a set of classified documents used to calculate knowledge sets.

weight—the numeric value assigned to a token or document for a category based on the training for a particular algorithm.

word—a combination of characters used to denote meaning in a language.

named entity replacement—grouping a word or set of words into a single token. Example: "Alex", "Sarah", and "Jill" can all be variabilized into the token "_name_".

II. Dynamic Messaging System

To facilitate the discussion, FIG. 1 is an example logical diagram of a system for generating and implementing messaging campaigns, shown generally at 100. In this example block diagram, several users 102a-n are illustrated engaging a dynamic messaging system 108 via a network 106. Note that messaging campaigns may be uniquely customized by each user 102a-n in some embodiments. In alternate embodiments, users may be part of collaborative sales departments (or other collaborative group) and may all have common access to the messaging campaigns. The users 102a-n may access the network from any number of suitable devices, such as laptop and desktop computers, work stations, mobile devices, media centers, etc.

The network 106 most typically includes the internet, but may also include other networks such as a corporate WAN, cellular network, corporate local area network, or combination thereof, for example. The messaging server 108 may distribute the generated messages to the various message delivery platforms 112 for delivery to the individual recipients. The message delivery platforms 112 may include any suitable messaging platform. Much of the present disclosure will focus on email messaging, and in such embodiments the message delivery platforms 112 may include email servers (Gmail, yahoo, Hotmail, etc.). However, it should be realized that the presently disclosed systems for messaging are not necessarily limited to email messaging. Indeed, any messaging type is possible under some embodiments of the present messaging system. Thus, the message delivery platforms 112 could easily include a social network interface, instant messaging system, text messaging (SMS) platforms, or even audio telecommunications systems. While audio is possible with the given messaging system, it is often desirable for the recipient to have a seamless experience where the automated messages are virtually indistinguishable from messages authored by a sales associate. Due to inherent difficulties in generating realistically human sounding automated audio (much less imitating a specific sales associate), much of the present disclosure will focus on the generation of written textual messages.

One or more data sources 110 may be available to the messaging server 108 to provide user specific information, message template data, knowledge sets, insights, and lead information. These data sources may be internal sources for the system's utilization, or may include external third-party data sources (such as business information belonging to a customer for whom the campaign is being generated). These information types will be described in greater detail below.

Figure 2:
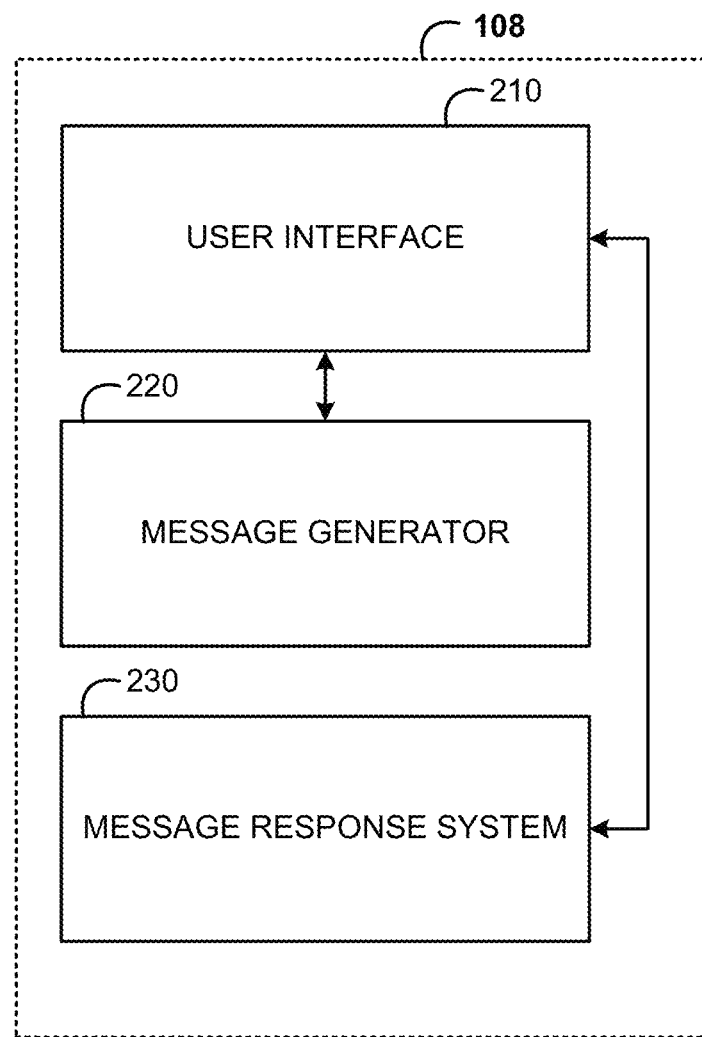
FIG. 2 is an example logical diagram of a dynamic messaging server, in accordance with some embodiment.

Moving on, FIG. 2 provides a more detailed view of the dynamic messaging server 108, in accordance with some embodiment. The server is comprised of three main logical subsystems: a user interface 210, a message generator 220, and a message response system 230. The user interface 210 may be utilized to access the message generator 220 and the message response system 230 to set up messaging campaigns, and manage those campaigns throughout their life cycle. At a minimum, the user interface 210 includes APIs to allow a user's device to access these subsystems. Alternatively, the user interface 210 may include web accessible messaging creation and management tools, as will be explored below in some of the accompanying example screenshots.

Figure 3:
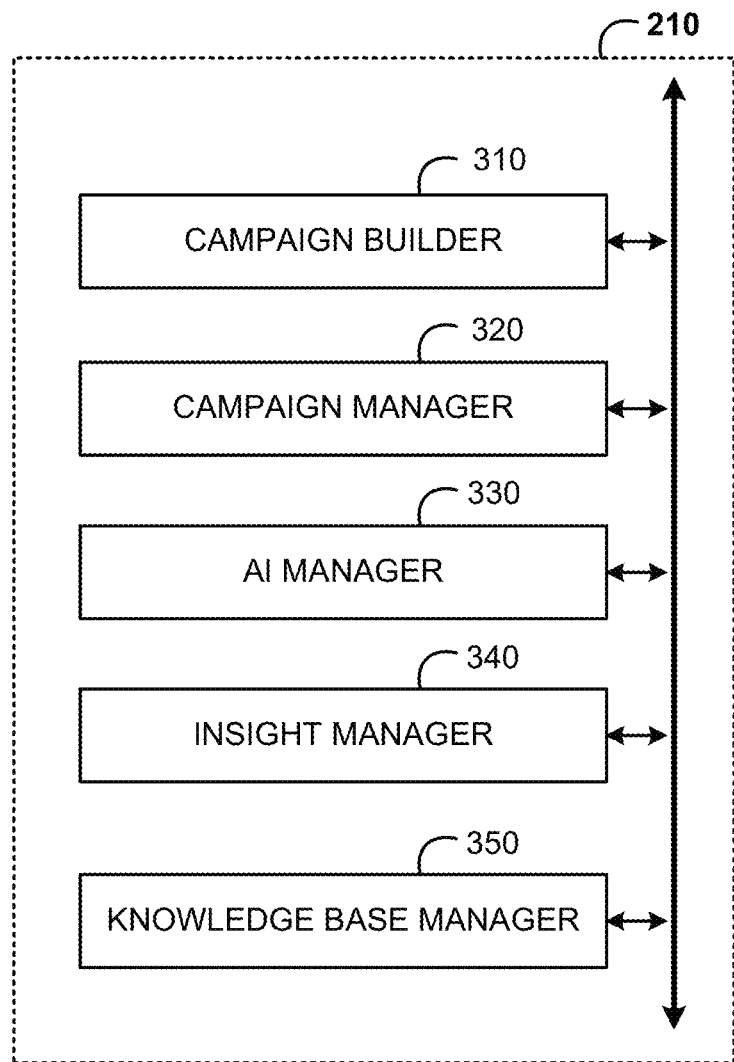
FIG. 3 is an example logical diagram of a user interface within the dynamic messaging server, in accordance with some embodiment.

FIG. 3 provides a more detailed illustration of the user interface 210. The user interface 210 includes a series of modules to enable the previously mentioned functions to be carried out in the message generator 220 and the message response system 230. These modules include a campaign builder 310, a campaign manager 320 an AI manager 330, an insight manager 340, and a knowledge base manager 350.

The campaign builder 310 allows the user to define a campaign, and input message templates for each series within the campaign. A knowledge set and lead data may be associated with the campaign to allow the system to automatically effectuate the campaign once built. Lead data includes all the information collected on the intended recipients, and the knowledge set includes a database from which the AI can infer context and perform classifications on the responses received from the recipients.

The campaign manager 320 provides activity information, status, and logs of the campaign once it has been implemented. This allows the user 102a to keep track of the campaign's progress, success and allows the user to manually intercede if required. The campaign may likewise be edited or otherwise altered using the campaign manager 320.

The AI manager 330 allows the user to access the training of the artificial intelligence which analyzes responses received from a recipient. One purpose of the given systems and methods is to allow very high throughput of message exchanges with the recipient with relatively minimal user input. To perform this correctly, natural language processing by the AI is required, and the AI (or multiple AI models) must be correctly trained to make the appropriate inferences and classifications of the response message. The user may leverage the AI manager 330 to review documents the AI has processed and has made classifications for.

The insight manager 340 allows the user to manage insights. As previously discussed, insights are a collection of categories used to answer some question about a document. For example, a question for the document could include "is the lead looking to purchase a car in the next month?" Answering this question can have direct and significant importance to a car dealership. Certain categories that the AI system generates may be relevant toward the determination of this question. These categories are the 'insight' to the question, and may be edited or newly created via the insight manager 340.

In a similar manner, the knowledge base manager 350 enables the management of knowledge sets by the user. As discussed, a knowledge set is set of tokens with their associated category weights used by an aspect (AI algorithm) during classification. For example, a category may include "continue contact?", and associated knowledge set tokens could include statements such as "stop", "do no contact", "please respond" and the like. The knowledge base manager 350 enables the user to build new knowledge sets, or edit exiting ones.

Figure 4:
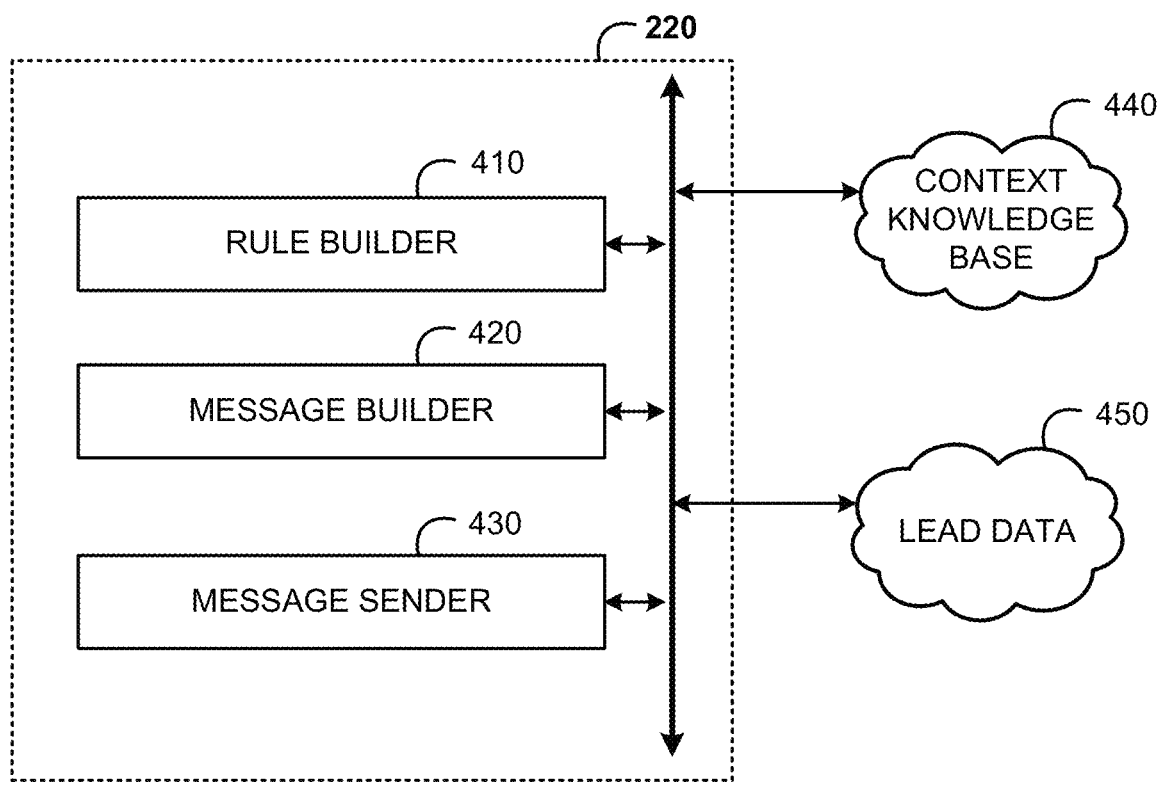
FIG. 4 is an example logical diagram of a message generator within the dynamic messaging server, in accordance with some embodiment.

Moving on to FIG. 4, an example logical diagram of the message generator 220 is provided. The message generator 220 utilizes context knowledge 440 and lead data 450 to generate the initial message. The message generator 220 includes a rule builder 410 which allows the user to define rules for the messages. A rule creation interface which allows users to define a variable to check in a situation and then alter the data in a specific way. For example, when receiving the scores from the AI, if the insight is Interpretation and the chosen category is 'good', then have the Continue Messaging insight return 'continue'.

The rule builder 410 may provide possible phrases for the message based upon available lead data. The message builder 420 incorporates those possible phrases into a message template, where variables are designated, to generate the outgoing message. This is provided to the message sender 430 which formats the outgoing message and provides it to the messaging platforms for delivery to the appropriate recipient.

Figure 5A:
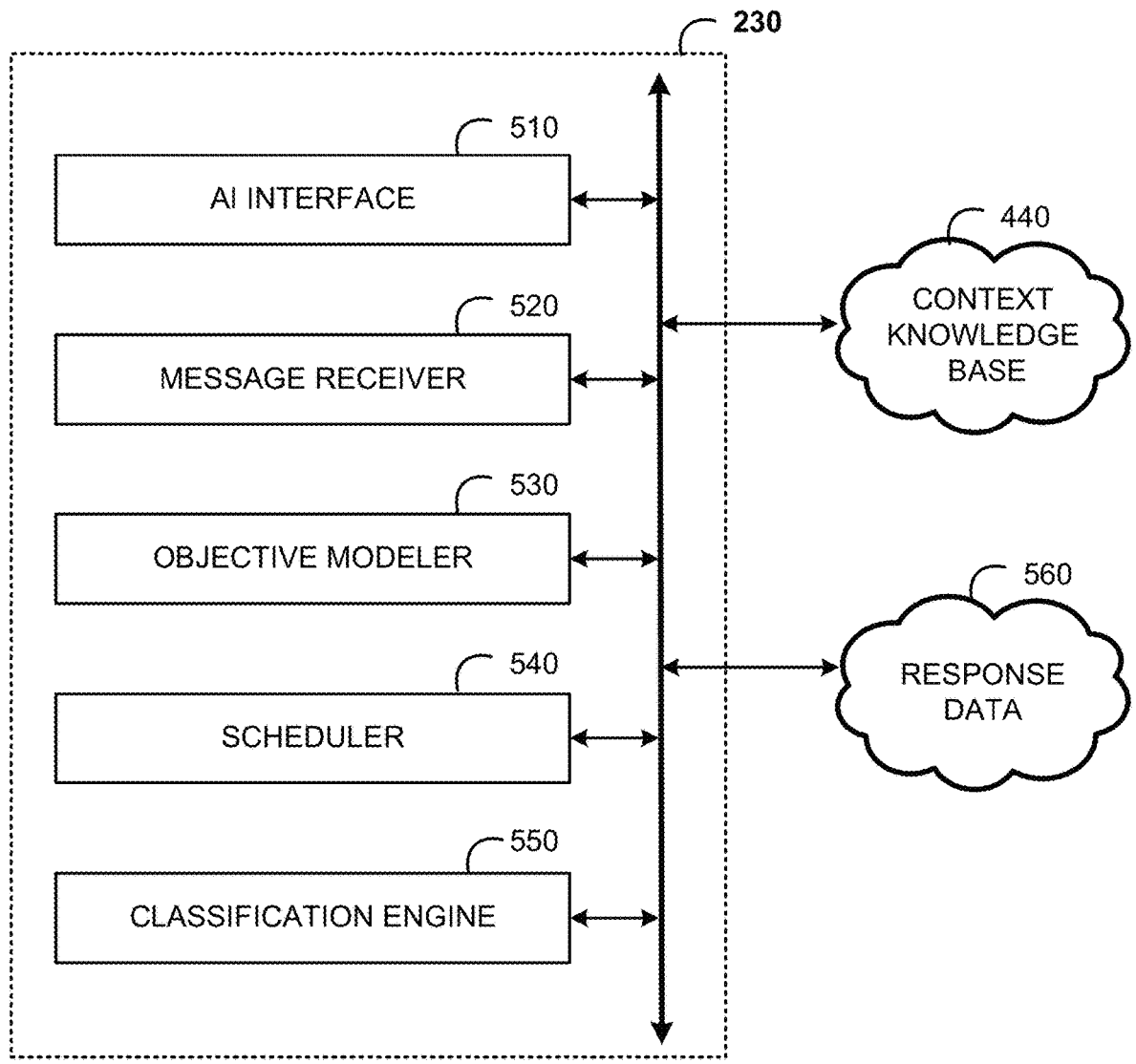
FIG. 5A is an example logical diagram of a message response system within the dynamic messaging server, in accordance with some embodiment.

FIG. 5A is an example logical diagram of the message response system 230. In this example system, the contextual knowledge base 440 is utilized in combination with response data 560 received from the lead. The message receiver 520 receives the response data 560 and provides it to the AI interface 510, objective modeler 530, and classifier engine 550 for feedback. The AI interface 510 allows the AI platform (or multiple AI models) to process the response for context, insights, sentiments and associated confidence scores. The classification engine 550 includes a suite of tools that enable better classification of the messages. Based on the classifications generated by the AI and classification engine 550 tools lead objectives may be updated by the objective modeler 530.

The message receiver 520 can then determine whether there are further objectives that are still pending, or whether there has been a request to discontinue messaging the lead. If there has been a termination request, or if all objectives have been fulfilled, the message receiver may deactivate the campaign for the given lead. If not, a scheduler 540 may be employed to assist in scheduling the next step of the campaign.

Figure 5B:
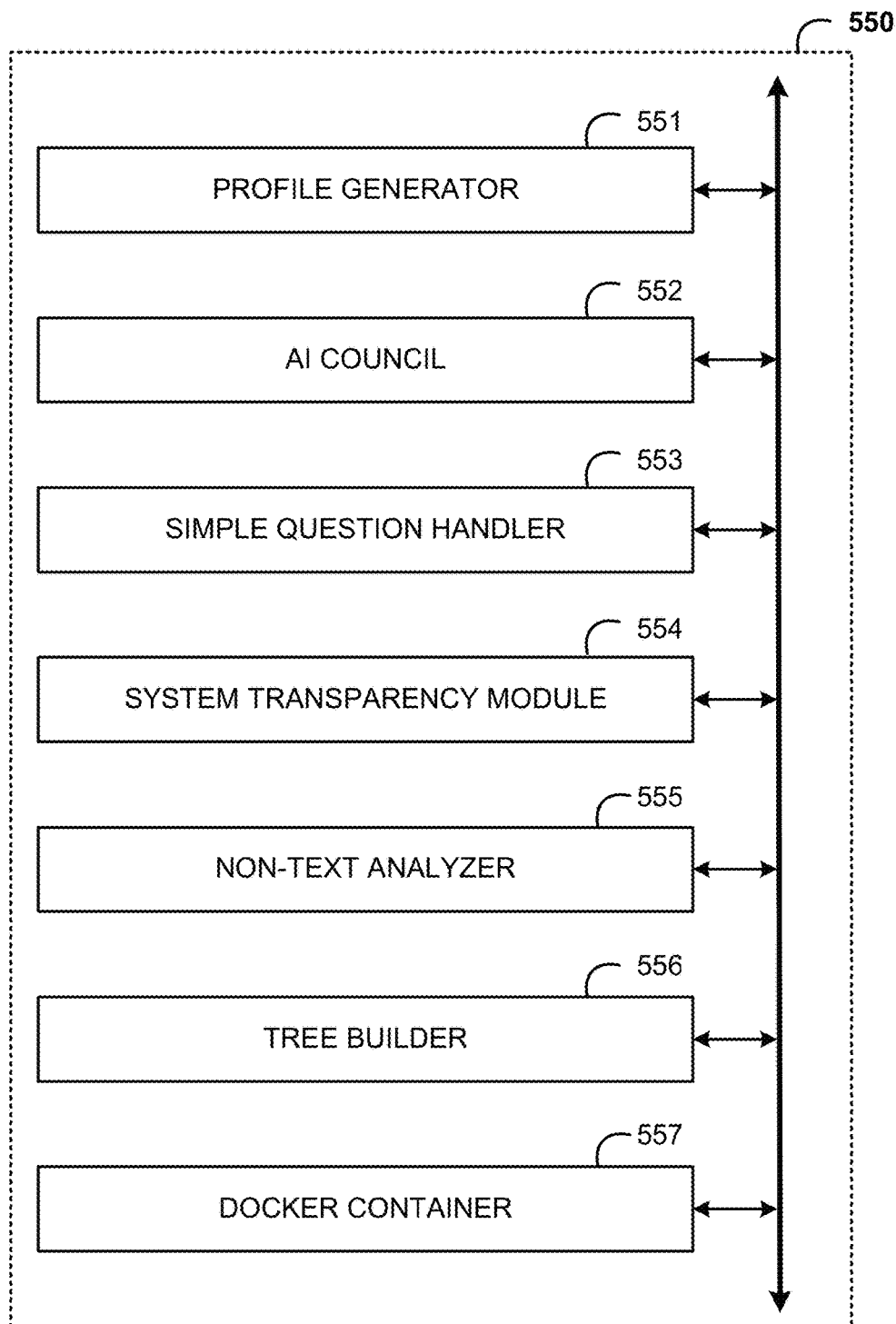
FIG. 5B is an example logical diagram of a classification engine within the message response system, in accordance with some embodiment.

Turning to FIG. 5B, the classification engine 550 is illustrated in greater detail. This component of the message response system may include modules for the generation of user profiles 551. The user profile generator 551 used information gained from the user's communications to append a profile with information related to education levels, language fluency, sentiments and behavioral drivers. Language fluency and education level may directly impact the language and sentence complexity used to communicate with the user. Sentiment and behavioral driver profiles may be utilized to select from different messaging sentiments based upon likelihood of success at meeting the objectives. Examples of one framework for utilizing behavioral drivers include identifying a dominant function for the lead. Functions traditionally are thought of as the elements of a personality type, and these include sensation, intuition, thinking and feeling. Each of these functions may be more susceptible to persuasion in different ways compared to one another. For example, a sensation focused lead may react well to messages that include details and concrete facts. In contrast, intuition focused leads may be more influenced by abstractions and theory based reasoning. Thinking individuals tend to be influenced by more rational arguments, whereas feeling individuals may be more heavily influenced by empathy and needs of people involved. Thus, a message campaign with a social justice element may be more effective for a 'feeling' focused lead, whereas a lead focused on sensation may react best to a message with details regarding a sale.

An additional component of the classification engine 550 is the AI council (a set of business rules, another ML model that takes the outputs of other models, or a combination of these) 552, which directly interfaces with more than one AI models that each independently reviews an incoming document for insights, classification and sentiments. Ideally, a unified AI model would be employed to analyze a given document as having non-redundant processing of the message results in reduced processing demands and hence lower system overhead. However, it has been found that different models perform better under certain circumstances, and thus, to improve the classification of the messages, the present system may employ an ensemble (combination through simple voting, weighted voting and other approaches) of AI models to analyze the document in parallel. This often results in differences in classification, sentiment scores, and confidence levels. For very small differences in these values, the impact on the final score may be minimal, but sometimes these differences may become material, and the AI council 552 may be utilized to reconcile these scores. At the heart of the AI counsel 552 is a weighted average of the outputs from the different AI models. The AI counsel 552 is unique in the manner that the different weights are calculated. These weights may vary over time, and may be situationally dependent. The AI council 552 may perform a lookup on historical accuracy levels for the given models, and weight them accordingly. This accuracy table may include a number of entries that are situationally dependent. For example, the default situation may average three models, in one example. Model A is accurate 87% of the time, model B is accurate 95% of the time, and model C is accurate 70% of the time. For this example, the weights applied to these models would be 0.3, 0.6 and 0.1 respectively. In some embodiments, these weights are driven by historical data on which model might be more accurate and confident for particular conversations and/or industries and are user configured, in this example, but could be based upon the standard deviation of the accuracy levels or use the outputs of subordinate models as inputs to higher-level ML models, which may use any number of statistical means to determine the best output based on the given inputs. For example, for the given numbers, the standard deviation is 10.42. Thus, in this specific example, model A and model B are within one standard deviation of one another, whereas model C is a full four standard deviations from the highest model accuracy. Obviously, with this example of three models, determining standard deviation is prone to exaggeration due to the low number of samples.

Using the above example, one way of determining the given weight ($w_i$) may be expressed as the following:

$$w_i = \frac{1}{N}\left(1 + \frac{(x_i - x')}{Cs_x}\right)$$

where, $x_i$ is the accuracy of model i, $x'$ is the mean of the model accuracies, $s_x$ is the standard deviation of the model accuracies, N is the number of models utilized, and C is a configurable constant. In some embodiments C may be set to a value of 3. Lower values for constant C increase the degree of impact the difference between the accuracy and the mean influences the weight, whereas larger values for constant C decrease the differences in weights afforded the models. Returning to the above example, for a default situation the model accuracies are recorded in the accuracy table as 87%, 95% and 70%. However, these accuracy values may also be recorded in the table differently given different situational factors. For example, if another language is utilized, it is possible alternate models may become more accurate. For example, if the message analyzed is in French, the accuracies for models A, B and C respectively may change to 85%, 80% and 90%. Likewise, for leads with different education level (and therefore nuanced differences in writing style and concept conveyance), the models may again score differently: 92%, 85% and 70% for example. Other situational factors that may be incorporated into the accuracy tables for models may also include industry segment, nature of the conversation/campaign type, lead personality type, campaign vehicle (e.g., text message versus emails) and any other relevant factor.

Turning back to FIG. 5B, another tool located in the classification engine 550 is the "Frequently Asked Questions and Approved Answers" module (FAQAA) 553. While there have been a great number of advancements in natural language processing over the years, the ability for a machine to answer a human's question reliably, and in a manner that does not notify the user that she is communicating with a machine, is still very limited. To enhance user experience, clients can upload a set of approved questions and associated answers. When a user-response is received, the NLP system searches through sentences to detect questions. If a detected question is matched with a FAQ, the corresponding action is injected into the next outgoing message. The motivation for such behavior is that a lead is very quickly discouraged, and may even be offended, if she believes she is communicating with a machine rather than another human.

Thus, for most situations where the lead poses a question in a message, the system will elevate the campaign to a human user. However, there are some questions a lead may ask which are considered "simple" or "routine" that the system may be designed to handle without human intervention. These include questions such as store hours, presence of merchandise at a given store location, business location, extensions, etc. These questions may be generated by the campaign manager and input into the simple question handler 553 as a training set. The campaign manager then links the training question to customer specific information located in a third-party database belonging to the customer. For example, if the customer building campaigns is a car dealership, the campaign manager may input a training question of "Do you have a [brand,make,model] in stock?". The manager may then couple the message response system, which is implemented on its own servers, to the car dealership inventory database through the network. The system then parses the training questions into n-grams, and applies a synonym database to each n-gram of the training question. This results in the generation of many hundreds or even thousands of permutations of the training questions. Given the above example, the following would all be generated by the synonym replacement: "Do you a [brand,make,model] in inventory?", "Is there a [brand,make,model] in stock?", "Do you have a [brand,make,model] in store?", "Do you keep a [brand,make,model] in stock?", etc.

These multitudes of training questions may be used by the machine learning AI to model the simple questions and generate a result including a feature/template answer populated with data derived from the third-party database.

Another component of the classification engine 550 is a system transparency handler 554. The system transparency handler 554, at a very high level, includes a user interface populated with a number of features that allows a user to see and modify a number of details regarding the AI performance and function. These may include information regarding upstream nodes, primary questions being asked at any given node, lists of actions the AI or operator can take at a given node, insights, usage volumes, and performance metrics for the given node.

For this discussion "insights" includes, triggering events that the AI relies upon before performing a particular action. These insights may vary from one node to another. Performance metrics may include information for the node related to the percentage of the time the node result in a handoff to a human operator (expressing a confidence of the AI at the given node), the percent audit occurred (expressing an error percentage when the AI thought it was indeed confident), and an percent audit for the human operator (expressing the "difficulty" of delivering an appropriate response at the node).

The system transparency module 554 provides a graphical display to the campaign manager that allows them to better understand what the system is actually doing, rather than appearing as a "black box" where messages responses from a lead go in and return messages come back out. By allowing the campaign manager to "peek under the hood" of the system, the campaign manager can gain confidence in the systems functioning, and when an error occurs, enables the campaign manager to better identify the breakdown. For example, the output of the transparency module 554 may include an overlay of the insights gained from a leas message. If one insight is grossly incorrect, the campaign manager can determine which portion of the message was relied upon to make the erroneous insight, and the model may be updated to prevent this sort of error.

In addition to identifying text and classifying written words, embodiments of the classification engine 550 may also include non-text analyzers 555 that take in non-textual information and generate outputs. Again, due to the focus on email and/or text messaging campaigns, the inputs that are non-textual are often embedded emoticons/emoji, or embedded images or occasionally movies. Emoticons in particular have proliferated within text and email messaging, and are used almost exclusively to convey an emotion. This information is extremely helpful for the calculation of the lead's sentiment, and the non-text analyzer 555 is able to leverage these elements to more accurately classify a response.

Emoticon analysis may include a basic table lookup of emoticons against sentiment values and/or insights. For example, the "clapping hands" emoticon and variants of the "smiley face" may all be used to modify the sentiment score to be more positive. A "thumbs up" emoticon may be construed as being an affirmation statement. Conversely, a "frowny face" or "mad face" may be utilized to downgrade the sentiment score.

Video information may have the audio components isolated and analyzed in much the same manner as text. This analysis may additionally include the incorporation of third party data regarding source and/or content/context/meaning of the video file or image. The video may be also analyzed for ambient color and brightness, which are often associated with a mood or sentiment. Images may also be analyzed for any embedded text, facial information, etc. Third party applications can be leveraged to extend the power of multimedia classification. Additional video, audio or text classifiers can be integrated to response-analysis to further inform our Inference Engine downstream. The system may be configured to ignore images embedded in signature lines however, since these are frequently used as an automatic feature and provide the system with minimal additional information.

Returning to FIG. 5B, the final element of the classification engine 550 is a tree builder 556 which is an internal tool to enable system configuration. The Tree builder 556 is used by an admin user to build a classification tree for each state in a conversation. The decision tree may have a knowledge base that is different from the classifiers used previously, as well as different thresholds required for the classification. Decision trees enable the integration of machine-learning with business logic. Business decisions are applied based on classifier results and confidence thresholds. An admin user can use the tree-builder to select classifiers to associate with nodes in a conversation. The user can click on nodes to add, edit or delete a classifier from the tree. For each node in a tree, the user can apply a confidence threshold. To ensure quality, an admin user can test a tree's performance against a validation set before publishing.

The decision tree enables developers to integrate the machine learning with business logic. Business decisions may be configured to be based on classifier results and confidence thresholds. The decision tree is built after the machine learned model has been populated. The developer selects classifiers to associate with nodes in the decision tree. The developer may add, delete or select a node in the tree. For a selected node, the developer sets a confidence threshold. If the AI model is unable to achieve this confidence threshold, the class assigned is "uncertain" and the message is routed for disambiguation by a human operator.

Before 'finalizing' a built tree, the user may test the tree's performance versus a validation set of data. Validation sets provide expected accuracy and confidence for the tree by comparing the tree's predicted classification against known answers.

Once in process, when a document is received the decision tree may produce a confident classification or initiate human review for "uncertain" situations. A confident classification occurs when each node in the tree meets or exceeds the node's confidence threshold. A single decision tree is capable of generating a single classification describing the final leaf node. Once decision tree results are aggregated for a message, business logic determines if one or more system actions should be triggered.

III. Methods of Messaging

Now that the systems for dynamic messaging campaigns have been broadly described, attention will be turned to processes employed to generate and present the customized media. In FIG. 6 an example flow diagram for a dynamic message campaign is provided, shown generally at 600. The process can be broadly broken down into three portions: the on-boarding of a user (at 610), campaign generation (at 620) and campaign implementation (at 630). The following figures and associated disclosure will delve deeper into the specifics of these given process steps.

Figure 7:
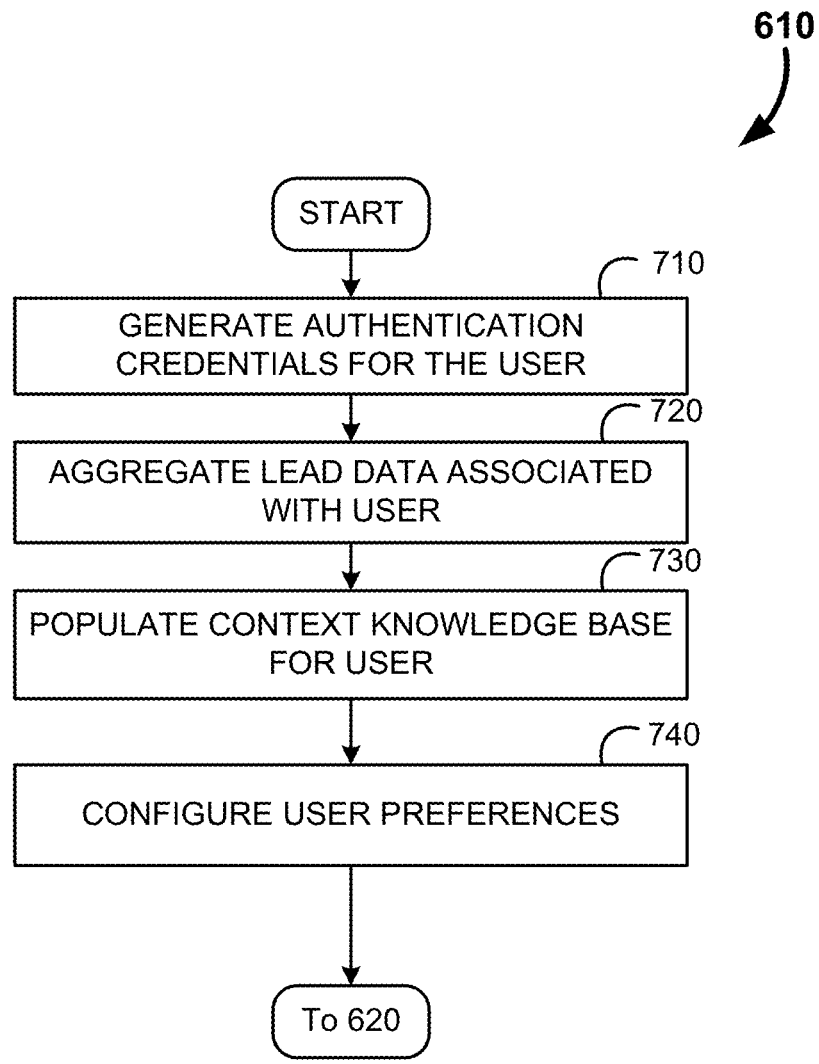
FIG. 7 is an example flow diagram for the process of on-boarding a business actor, in accordance with some embodiment.

FIG. 7, for example, provides a more detailed look into the on-boarding process, shown generally at 610. Initially a user is provided (or generates) a set of authentication credentials (at 710). This enables subsequent authentication of the user by any known methods of authentication. This may include username and password combinations, biometric identification, device credentials, etc.

Next, the lead data associated with the user is imported, or otherwise aggregated, to provide the system with a lead database for message generation (at 720). Likewise, context knowledge data may be populated as it pertains to the user (at 730). Often there are general knowledge data sets that can be automatically associated with a new user; however, it is sometimes desirable to have knowledge sets that are unique to the user's campaign that wouldn't be commonly applied. These more specialized knowledge sets may be imported or added by the user directly.

Lastly, the user is able to configure their preferences and settings (at 740). This may be as simple as selecting dashboard layouts, to configuring confidence thresholds required before alerting the user for manual intervention.

Figure 8:
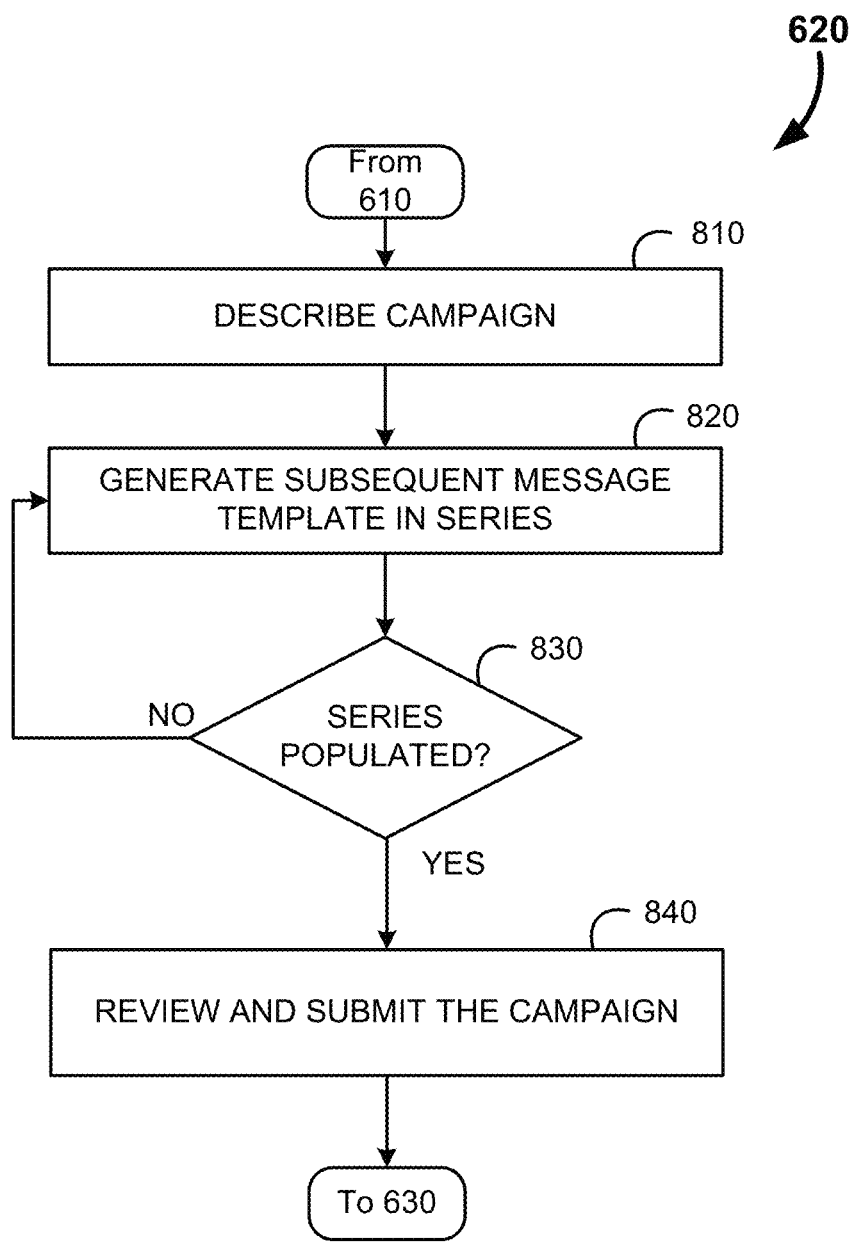
FIG. 8 is an example flow diagram for the process of building a business activity such as campaign, in accordance with some embodiment.

Moving on, FIG. 8 is the example flow diagram for the process of building a campaign, shown generally at 620. The user initiates the new campaign by first describing the campaign (at 810). Campaign description includes providing a campaign name, description, industry selection, and service type. The industry selection and service type may be utilized to ensure the proper knowledge sets are relied upon for the analysis of responses.

Figure 9:
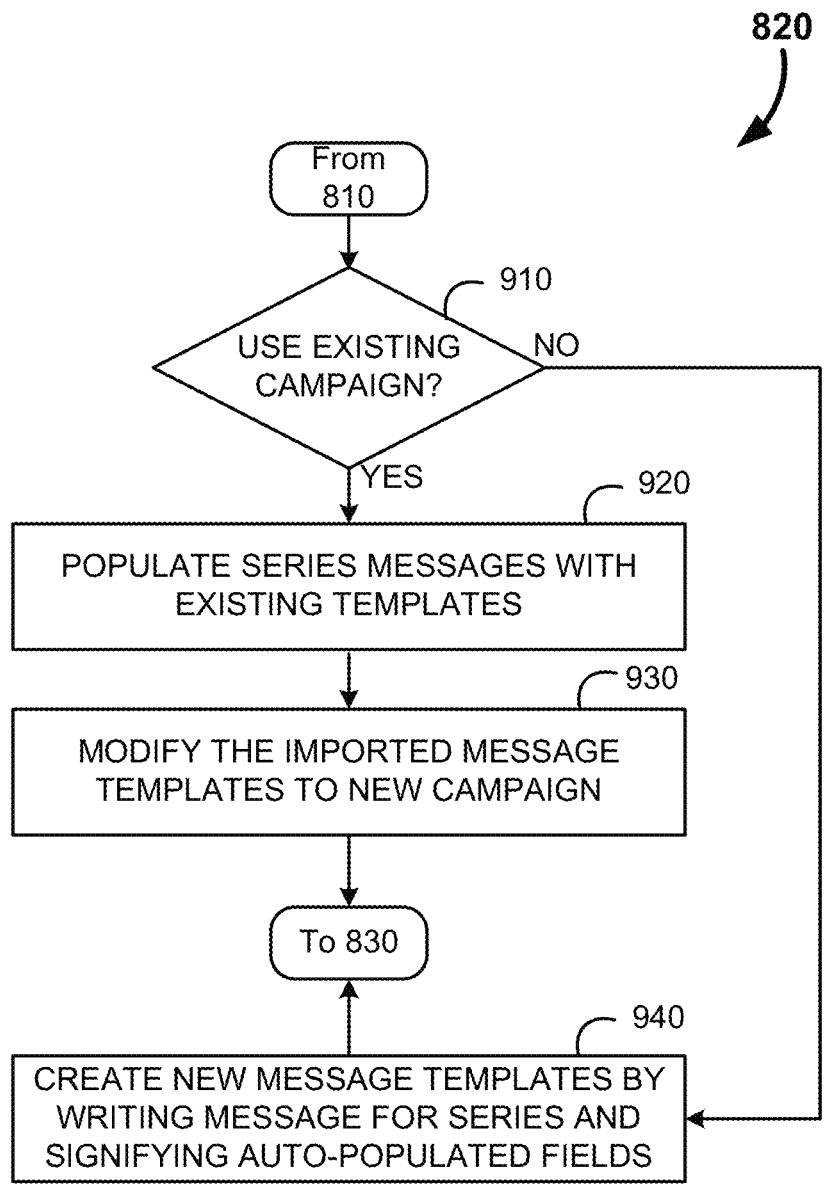
FIG. 9 is an example flow diagram for the process of generating message templates, in accordance with some embodiment.

After the campaign is described, the message templates in the campaign are generated (at 820). If the series is populated (at 830), then the campaign is reviewed and submitted (at 840). Otherwise, the next message in the template is generated (at 820). FIG. 9 provides greater details of an example of this sub-process for generating message templates. Initially the user is queried if an existing campaign can be leveraged for templates, or whether a new template is desired (at 910).

If an existing campaign is used, the new message templates are generated by populating the templates with existing templates (at 920). The user is then afforded the opportunity to modify the message templates to better reflect the new campaign (at 930). Since the objectives of many campaigns may be similar, the user will tend to generate a library of campaign that may be reused, with or without modification, in some situations. Reusing campaigns has time saving advantages, when it is possible.

However, if there is no suitable conversation to be leveraged, the user may opt to write the message templates from scratch using the Conversation Editor (at 940). When a message template is generated, the bulk of the message is written by the user, and variables are imported for regions of the message that will vary based upon the lead data. Successful messages are designed to elicit responses that are readily classified. Higher classification accuracy enables the system to operate longer without user interference, which increases campaign efficiency and user workload.

Figure 10:
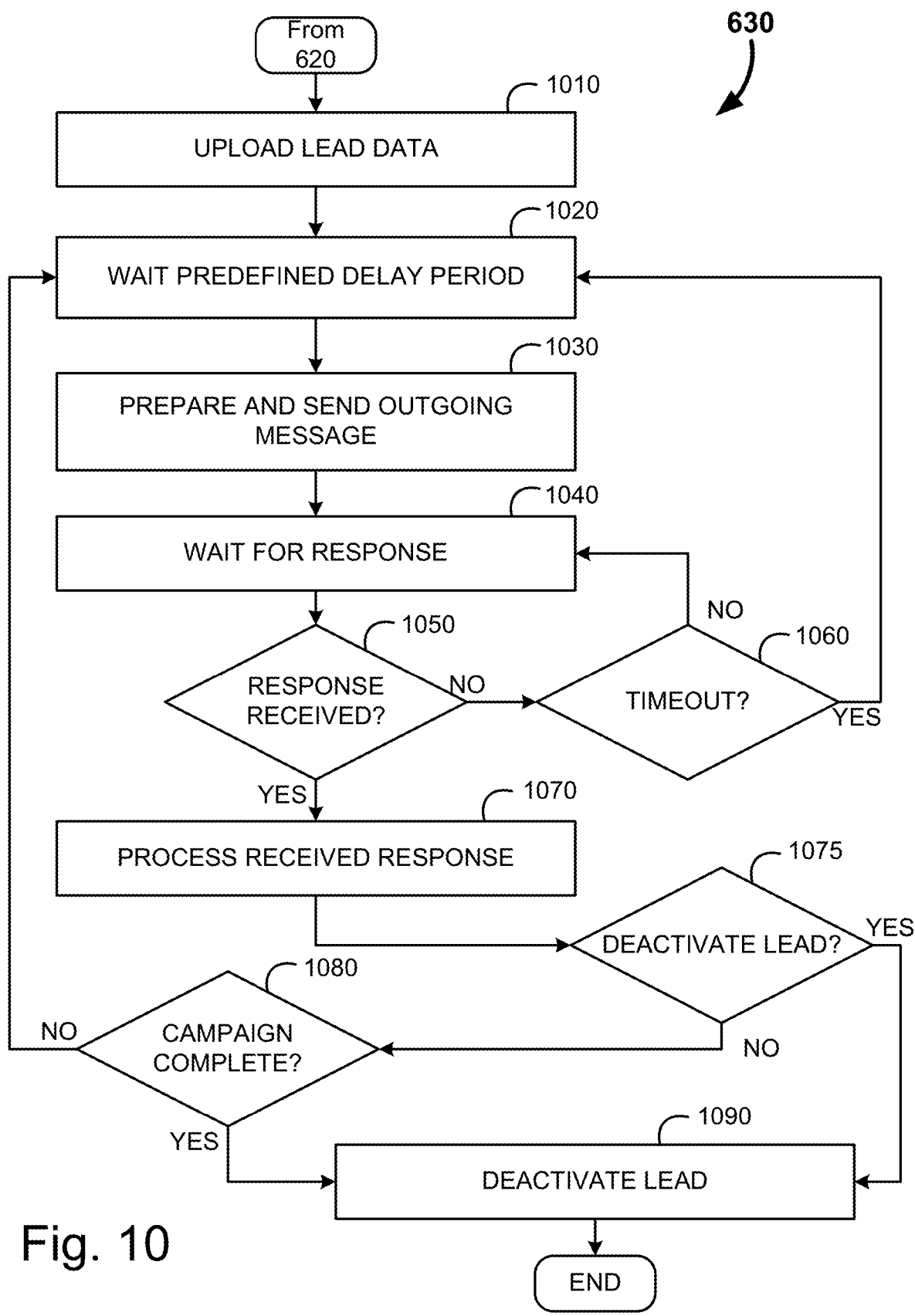
FIG. 10 is an example flow diagram for the process of implementing the campaign, in accordance with some embodiment.

Once the campaign has been built out it is ready for implementation. FIG. 10 is an example flow diagram for the process of implementing the campaign, shown generally at 630. Here the lead data is uploaded (at 1010). Lead data may include any number of data types, but commonly includes lead names, contact information, date of contact, item the lead was interested in, etc. Other data can include open comments that leads supplied to the lead provider, any items the lead may have to trade in, and the date the lead came into the lead provider's system. Often lead data is specific to the industry, and individual users may have unique data that may be employed.

An appropriate delay period is allowed to elapse (at 1020) before the message is prepared and sent out (at 1030). The waiting period is important so that the lead does not feel overly pressured, nor the user appears overly eager. Additionally, this delay more accurately mimics a human correspondence (rather than an instantaneous automated message).

Figure 11:
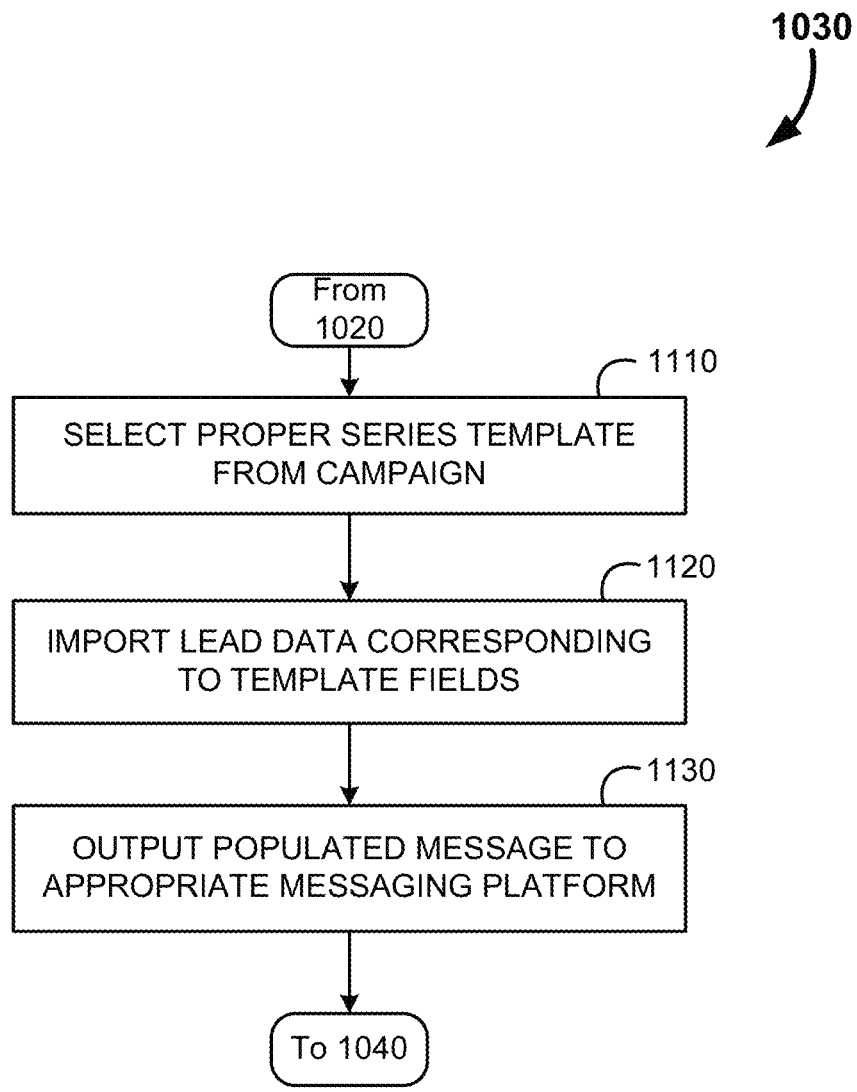
FIG. 11 is an example flow diagram for the process of preparing and sending the outgoing message, in accordance with some embodiment.

FIG. 11 provides a more detailed example of the message preparation and output. In this example flow diagram, the message within the series is selected based upon which objectives are outstanding (at 1110). Typically, the messages will be presented in a set order; however, if the objective for a particular lead has already been met for a given series, then another message may be more appropriate. Likewise, if the recipient didn't respond as expected, or not at all, it may be desirous to have alternate message templates to address the lead most effectively.

After the message template is selected from the series, the lead data is parsed through, and matches for the variable fields in the message templates are populated (at 1120). The populated message is output to the appropriate messaging platform (at 1130), which as previously discussed typically includes an email service, but may also include SMS services, instant messages, social networks, or the like.

Returning to FIG. 10, after the message has been output, the process waits for a response (at 1040). If a response is not received (at 1050) the process determines if the wait has been timed out (at 1060). Allowing a lead to languish too long may result in missed opportunities; however, pestering the lead to frequently may have an adverse impact on the relationship. As such, this timeout period may be user defined. Often the timeout period varies from a few days to a week or more. If there has not been a timeout event, then the system continues to wait for a response (at 1050). However, once sufficient time has passed without a response, it may be desirous to return to the delay period (at 1020) and send a follow-up message (at 1030). Often there will be available reminder templates designed for just such a circumstance.

Figure 12:
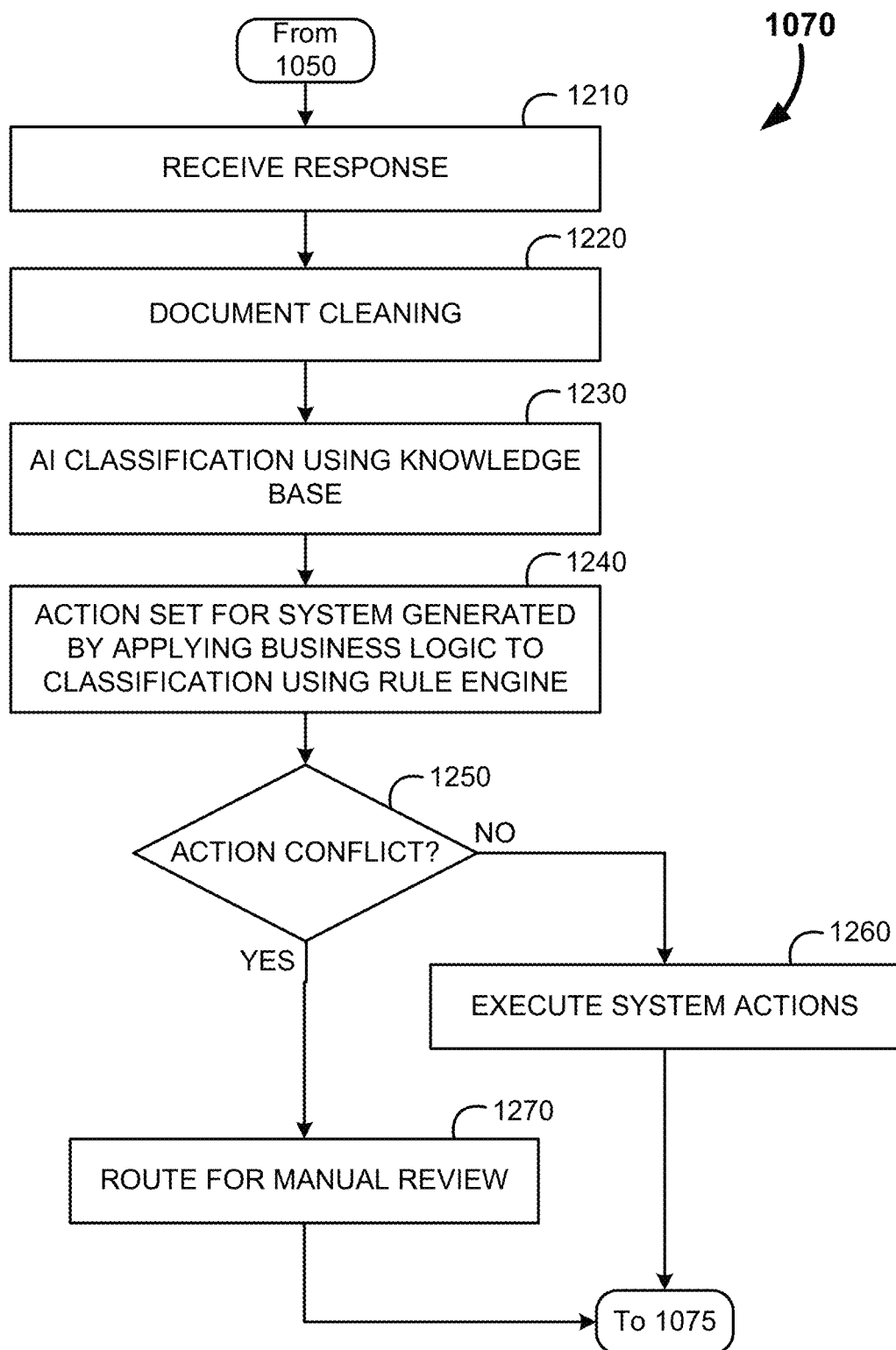
FIG. 12 is an example flow diagram for the process of processing received responses, in accordance with some embodiment.

However, if a response is received, the process may continue with the response being processed (at 1070). This processing of the response is described in further detail in relation to FIG. 12. In this sub-process, the response is initially received (at 1210) and the document may be cleaned (at 1220). Document cleaning may include a normalization process where characters and tokens are removed to reduce the complexity of the document without changing the intended classification. Document cleaning has a number of steps to it. Upon initial receipt of the response, often a number of elements need to be removed, including the original message, HTML encoding for HTML style responses, enforce UTF-8 encoding so as to get diacritics and other notation from other languages, and signatures so as to not confuse the AI. Only after all this removal process does the normalization process occur, which includes variabilization, removing stop words, manual replacements, spelling corrections, and removal of punctuation, numbers, and any other tokens that are deemed unnecessary.

Figure 13:
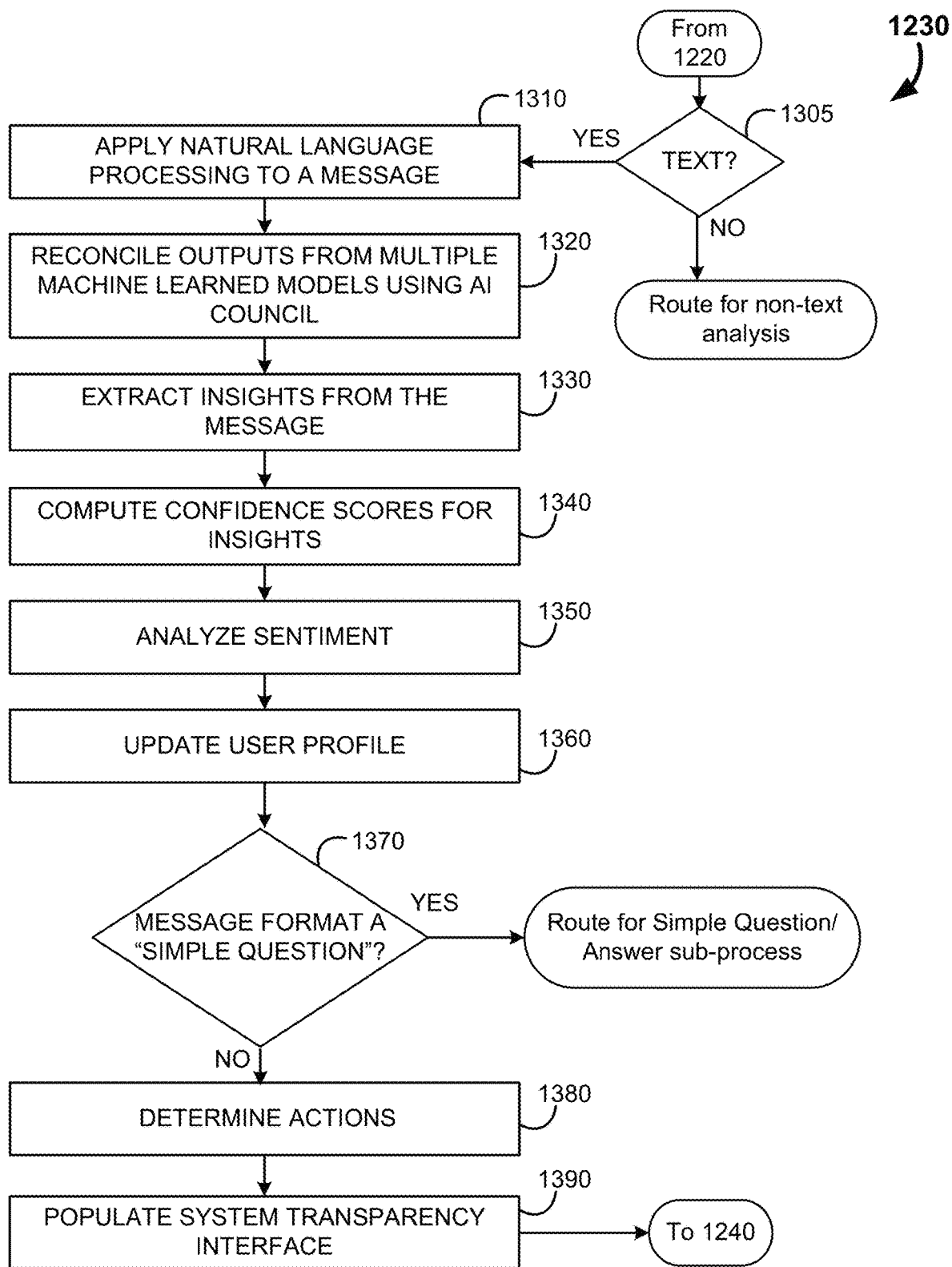
FIG. 13 is an example flow diagram for the process of AI classification, in accordance with some embodiment.

The normalized document is then provided to the AI platform for classification using the knowledge sets (at 1230). Classification is described in relation to FIG. 13 in considerably more detail. In this sub process the system initially determines if the content being classified is text or not (at 1305). As previously discussed, non-textual content may be processed through a separate analysis for meaning and sentiment. The process for analyzing non-text information will be discussed further below.

Conversely, text information is then processed by natural language processing (at 1310) by multiple machine learning AI models. As previously mentioned, there are a number of known algorithms that may be employed to categorize a given document, including knowledge based algorithms, rule based algorithms, naïve bayes, sentiment analysis, deep neural nets including convolutional neural networks and recurrent neural networks and variations, k-nearest neighbor, other vector based algorithms, etc. to name a few. In some embodiments, multiple algorithms may be employed simultaneously, and then a combination of the algorithm results are used to make the classification by utilizing the AI council (at 1320). The algorithm(s) selected may be those with the highest confidence level in their classification, or those who agree most closely to one another. As previously discussed, the AI council may alternatively perform a weighted average of the various AI outputs to generate a consolidated classification.

Figure 14:
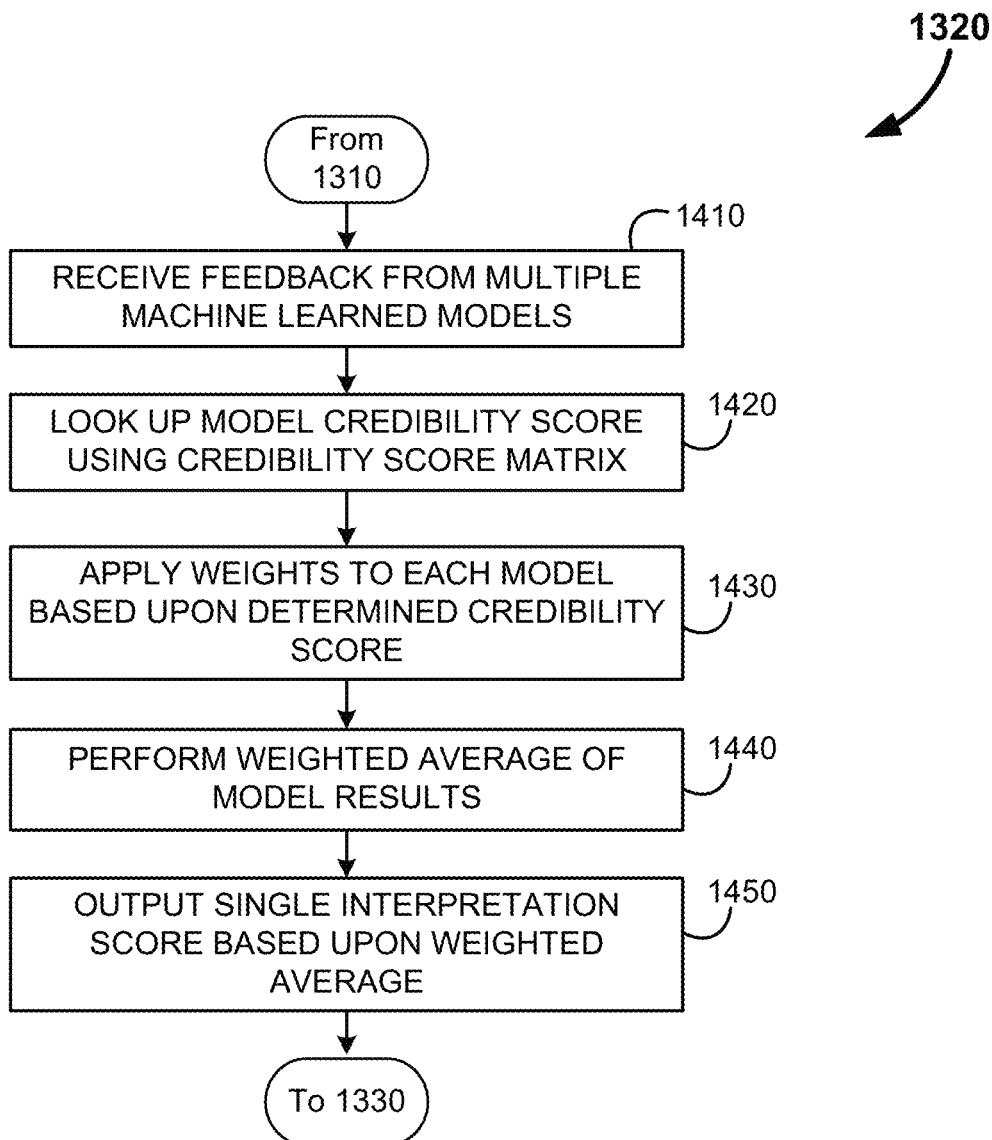
FIG. 14 is an example flow diagram for the process of AI council reconciliation, in accordance with some embodiment.

FIG. 14 discusses in greater detail this sub process for the AI council reconciling the inputs from multiple machine learned models. Initially the feedback from the various models is received (at 1410). As previously discussed, processing a document through multiple models in parallel has a processing cost; it simply requires more resources to process multiple algorithms compared to a single model. However, the advantage gained through this technique in terms of improved accuracy of the computer's ability to classify the document makes the processing overhead cost worthwhile. Once the AI council has received the results from the models, the system may look up accuracy scores for the models in a credibility score matrix (at 1420). The credibility score matrix is populated, over time, by comparing classification outputs of a model against Audit Desk output where correct classifications are already known. When the credibility score is below a required threshold, a document is sent to a Training Desk queue where a manual classification override occurs, and training data is acquired to continuously improve system efficacy. The credibility index includes a multitude of credibility scores for a given model, each based upon external factors. These may include situation type, industry, language used, and the personality type for a lead being analyzed. For example, responses to informational messages may be classified differently than responses to questions, and some models may be better at classification of questions versus another model.

After the proper credibility score has been determined for each model, the system may weight the models (at 1430). This weighting may include manual application of weights based upon accuracy values, or may employ a weighting algorithm that takes into account the standard deviation of the accuracy scores, such as provided as an example previously. After determination of the weights, the AI council may perform a weighted average of the models' results to render a single classification (at 1440). This single interpretation score is then output for further processing (at 1450).

Returning to FIG. 13, after the classification has been generated, the system renders insights from the message (at 1330). As previously noted, insights are categories used to answer some underlying question related to the document. The classifications may map to a given insight based upon the context of the campaign message. A confidence score is then generated for the insight (at 1340). Corresponding to each classification, the AI algorithm assigns the confidence score for the classification. These scores are outputs of the machine learning algorithms that are described before.

Next sentiment is analyzed (at 1350). Sentiment analysis is a determination of how strongly the category applies to the document. Sentiment may be computed using the same AI algorithms that were used for classifying insights. In this case, the classes would be the polarity (positive/negative) of opinion as expressed in the response in relation to an object (product being sold, for example).

Figure 15:
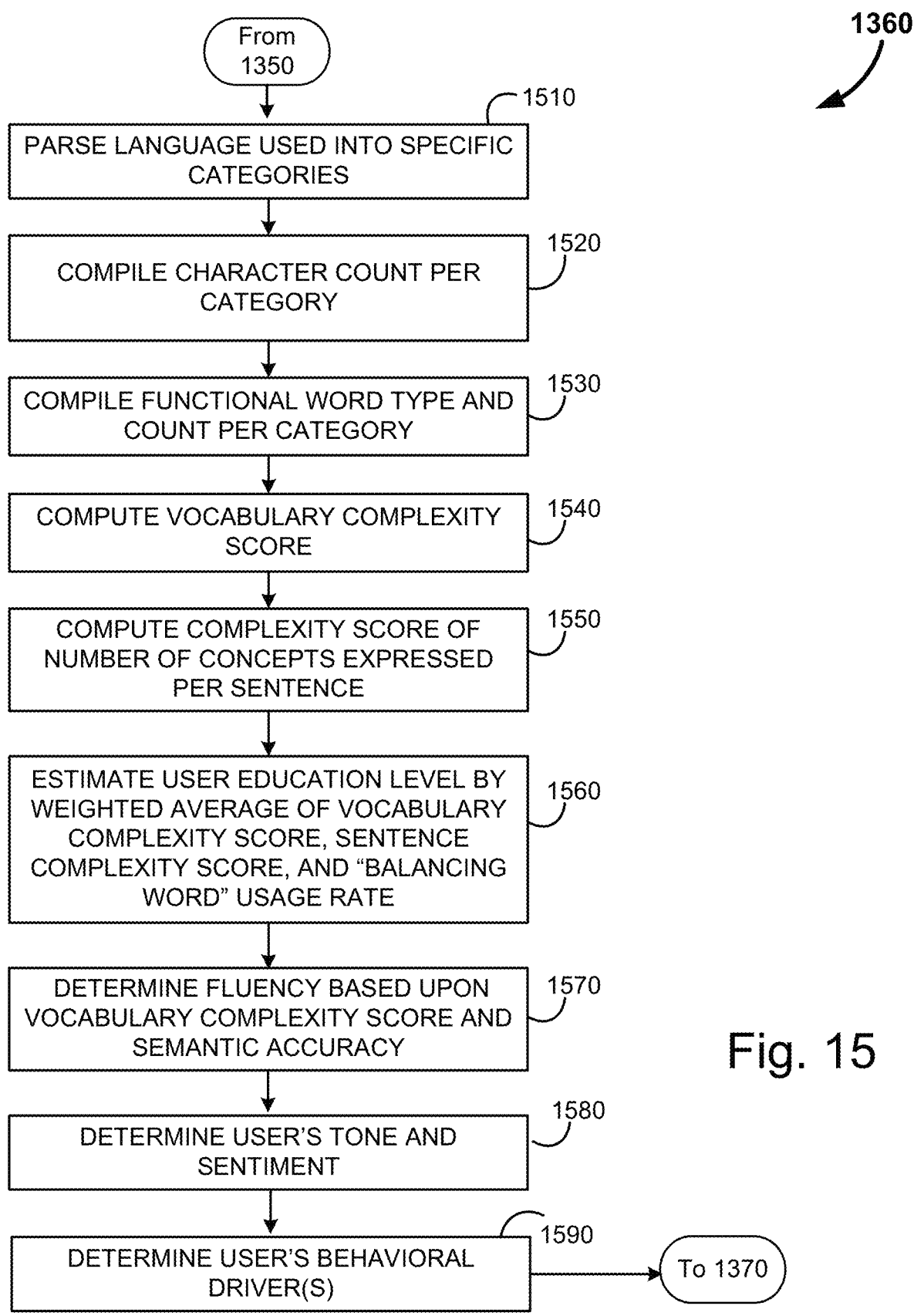
FIG. 15 is an example flow diagram for the process of populating a robust actor profile for response tailoring, in accordance with some embodiment.

Next the process updates the user's profile (at 1360) using the information garnered from the analysis of the documents received by the lead. This process is described in greater detail in relation to FIG. 15. The analysis of the user's profile starts with the parsing of the language used into specific categories (at 1510). These categories include emotion, perception, complex cognitive processes, and function words. Function words include pronouns, articles, conjunctions and numerals. Words belonging to complex cognitive processes category include those indicating a causal relationship and those that convey vagueness and "balancing words" (such as 'except', 'but', 'however', etc.). These categories are further broken down into subcategories. For example, in the emotional category, is the emotion 'happy' or 'scared'. Within the function words, a useful subcategory is between 'individual' versus 'group' (e.g., "I" and "me" versus "us" and "we"). Tools such as Linguistic Inquiry and Word Count (LIWC), or the like, may be adapted to perform this parsing. The process may compile character counts per category (at 1520) and determine the number of words in each of the categories (at 1530).

The complexity of the vocabulary may also be determined (at 1540) by comparing the words used by the lead against listings of vocabulary words by educational expectations. A complexity score may also be generated based upon the number of discrete concepts expressed per character count and per sentence (at 1550). All this information may be used to estimate the user's education level and/or IQ. Particularly, vocabulary complexity maps very well to education achievement. The presence of complex thought processes words, and the complexity score may map well to IQ level, and may also be indicative of education level. In some embodiments, an education level estimate may be generated by weighted averaging of the vocabulary complexity, computed complexity score and the presence of words indicative of complex though processes (such as balancing words). In some embodiments, each of these factors may be given equal weight. In alternate embodiments, the predictive measure of each of these factors may be compared against a control training set, where education level is known, and weights may be generated accordingly. In some embodiments, the weight of vocabulary usage is given greater weight, complexity score an intermediate weight, and complex though process word count a lower weight.

After computation of the lead's education level, the person's language fluency is analyzed (at 1570). This process used vocabulary used, complexity score and semantic accuracy to identify what language the user is familiar with (based upon vocabulary use), and degree of fluency (based upon complexity and semantic accuracy). This is important, as a fluent user of a language many be more influenced by eloquent and complex messages, but a less fluent user may merely be frustrated, and thus simpler messaging is preferable.

The user's tone and emotional sentiment may next be determined (at 1580). This sentiment is different from the document sentiment, which is a measure of the strength of a category of a document. Sentiment, in this context, relates to the disposition of the lead. The emotional words used by the user are the primary clue as to user tone/sentiment. However function wording may also provide insight into the lead's sentiment. For example, users who use more "individual" language such as "I" and "me" tend to be more insecure, threatened and defensive, compared to greater usage of "group" wording ("us" and "we"). It should be noted that analysis of word usage can likewise shed light on a number of other traits of the lead. For example, males tend to use more articles, prepositions and big words than women, who are more likely to use pronouns and reference other people. Likewise, word usage may indicate lead age, as older individuals tend to refer to themselves less over time, and use more positive emotion words and fewer negative emotion words. Older individuals also use more future tense verbs and fewer past tense verbs. Honest is another factor that may be analyzed for. When telling the truth, people more often use first person singular pronouns, and also use words such as "except" and "but".

Lastly, and very importantly, the behavioral drivers for the individual may be analyzed for (at 1370). These drivers, in some embodiments, may be personality traits, such as thinking, feeling, emotion, and perception, as discussed previously. Certain word frequency can indicate what personality type dominates a particular lead. For example, a lead with above average emotional category of words may have an 'emotional' personality type, whereas an individual which utilized a high number of prepositions and exclusionary words ("unless", "but", "except", etc.) may be more of a 'thinking' personality type. As noted previously, behavioral drivers/personality types may be used to tailor campaign messages to the lead in a manner that is more likely to influence that individual.

Although "emotion", "perception", "thinking" and "intuition" are the common Jungian personality types, other behavioral drivers/personality schemes may likewise be leveraged. Theme may include enneagram traits, and traditional behavioral economic drivers.

All of the information generated for the lead may be stored within a user profile for the lead. As additional messaging occurs, this information may be updated over time. This allows tracking of volatility to also be measured. This volatility may indicate accuracy of the profile. For example, if an individual is determined to be a high school graduate level education and subsequently a graduate level education, clearly there is a disconnect in the measurements. It could be that the user is in a different context and is choosing to write differently, or it may be that the system is operating using too little information to accurately determine the user's education level. Regardless, this volatility in the profile metric will indicate that the estimate for this feature of the lead is suspect, and may be inaccurate. In contrast, consistent estimates for any given profile element may act as reinforcement that the proper vales were accurately ascertained. Volatility in the sentiment/tone is to be expected, and does not denote inaccuracy of the measurement. However this volatility itself may be a useful metric of how quick a lead may be to change mood/degree of temperamentally.

Returning to FIG. 13, after the user's profile has been populated, the system may inquire if the document received is a "simple" question for which the system is capable of auto-generating a response (at 1370). If so, a separate process for automated response generation is initiated, as will be discussed below. This inquiry, as discussed previously, may depend upon a set of training questions for specific answers supplied by the campaign manager. These training questions may be subjected to a synonym replacement to generate a very large set of permutations for training questions. These are then fed to a machine learning algorithm to teach the model what questions should retrieve specific information. The retrieved information is stored in a separate database from the knowledge set used by the AI models. This separate database is typically a third party database of inventory, employees/extensions, store locations, store hours, etc.

If the message is not a "simple" question, the system may apply business logic to the classifications to determine the best action to take (at 1380). Campaign objectives, as they are updated, may be used to redefine the actions collected and scheduled. For example, 'skip-to-follow-up' action may be replaced with an 'informational message' introducing the sales rep before proceeding to 'series 3' objectives. Additionally, 'Do Not Email' or 'Stop Messaging' classifications should deactivate a lead and remove scheduling at any time during a lead's life-cycle.

Figure 16:
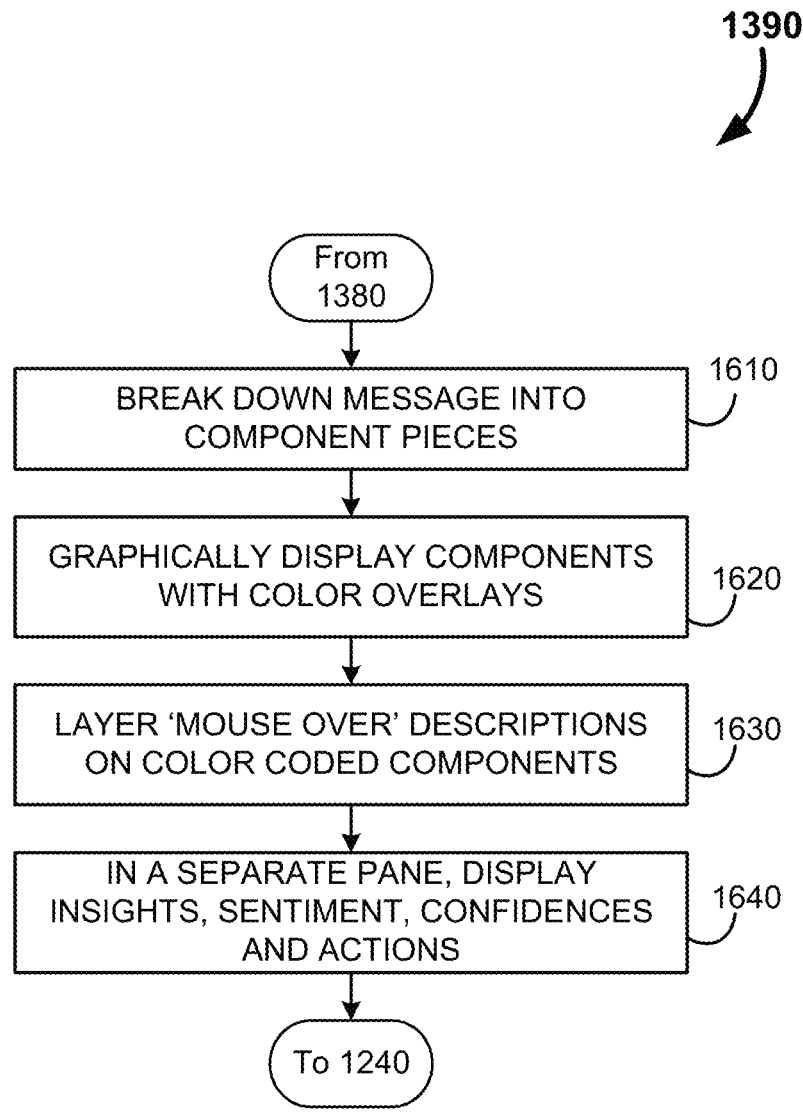
FIG. 16 is an example flow diagram for the process of generating a transparency interface, in accordance with some embodiment.

The system is also capable of populating a transparency interface (at 1390). This transparency process is described in greater detail in relation to FIG. 16. In this example process, the system breaks down the message into component chunks (at 1610), with each component having a discrete meaning, insight, or conveying a piece of information. These insights are have been previously extracted from the message and confidence scores have been computed for the given insights. Sentiment has also been determined, typically on a 0-100 score. Likewise, actions (if any) are decided upon using the computed insights. All of these activities have been previously discussed, and are essential to the process of generating a dynamic messaging system.

What is new for the conversation editor/transparency interface, however, is the compilation of these analytics into a user interface that allows a user to better understand "how" the AI system is operating. This has a number of advantages: the user is better able to identify nodes where there is "something wrong" with the analysis, the user is better able to train the AI, and lastly the user can better appreciate the work being performed by the AI system—thereby increasing comfort and reliance on the automated features. This generation of the confidence editor initially begins with the graphical display of the messages, with each of the component chunks overlaid with a different color for easy disambiguation (at 1620). Along with this color coding, the system may layer a "mouse over" description of the color coded component to help assist the user understand what the chunking signifies (at 1630). For example, if the message component states "Send me the details", by moving the cursor over this message component the system may provide, at a minimum, that this component relates to an insight of "interested in learning more". Other information that may be provided to the user may include the confidence level for the insight, and even the rules and/or NPL algorithms involved in making this conclusion, based upon implementation.

Moving on, the last element in the transparency interface process may generate is a separate information pane that includes top insights, other derived attributes, sentiment, confidence levels for the insights, and actions to be taken (at 1640). This pane provides a summary of critical information derived from the given message node. The pane described here, and shown in subsequent figures, may be regarded as a 'basic' view with the most critical information for the given message. More advanced views are also possible, which may include far more information, which can vary by communication channel. For example for email communications, IP address and other header information could be included in the summary pane. For audio communications, the routing or call setup details from the mobile tower involved (including location data) could be included. As can be seen, the details provided may include locally derived information (such as insights) and information received from 3rd part sources (such as cellular tower data). Attributes for a given lead may be tracked to assist in future predictive analysis. Further, some attributes, such as the sentiment, may be a basic compilation score (0-100 scale for example) or may be multi-faceted. For sentiment for example, this score may be broken into a continuum for happy/unhappy, and also a score for clear/confused. Likewise, it may be possible to go beyond sentiment for the given message node, and provide the previously populated behavioral profile for the lead, which becomes more robust as the lead interacts with the AI system. This profile can indicate how patient/impatient the lead is, decision making tendencies (analytical versus emotional), temperament, education level, likes, etc., as previously discussed. The speed of which the AI sends a given message to a human operator may be influenced by this profile, as well as response tactics.

Figure 17:
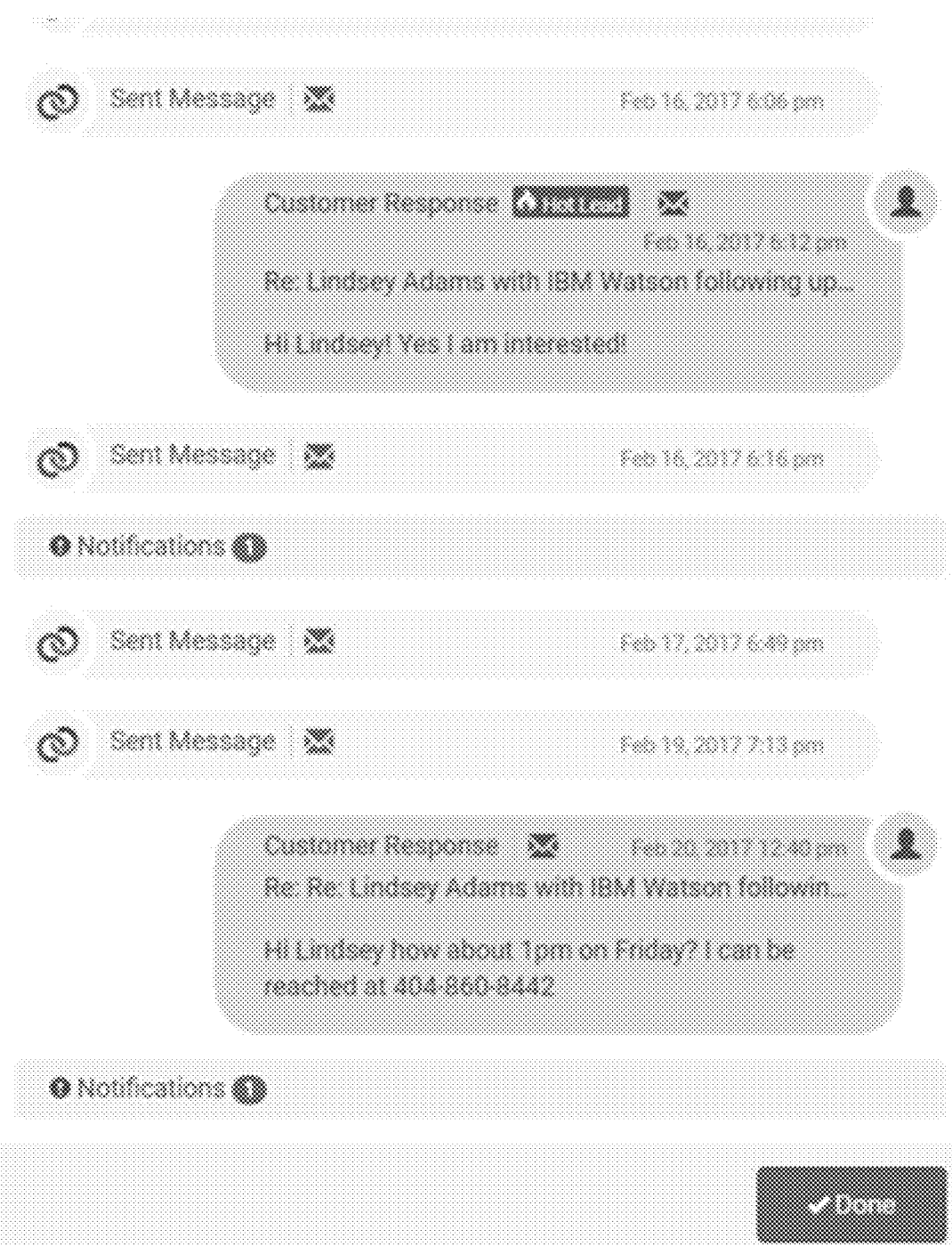
FIG. 17 is an example illustration of a possible message exchange between the message response system and a lead, in accordance with some embodiment.
Figure 18:
FIG. 18 is an example illustration of the message being overlaid with transparency labels, in accordance with some embodiment.

To more clearly explain the transparency interface output, FIG. 17 provides an example screenshot 1700 for a message string between a lead and the AI system. The responses from the lead are illustrated for the user's benefit. These message nodes are analyzed as discussed above, and a color-coded display of the messages is provided to the user, as seen in reference to FIG. 18 at 1800. Here, rather than colors, the message components are shaded at different levels to comport to patent office restrictions regarding color in the figures. Regardless, it can be seen that different components of the message such as "Hi Lindsey!" and "Yes I am interested!" are determined to be separate, and convey discrete meanings. If the user were to move the cursor over the different components, the system would present what information is being derived from the message component, and the confidence level for the insight being generated.

Next, as discussed above, the system derives a summary pane with the insights, confidence levels, other details, and actions all illustrated in an easily understood manner for the user's consumption, as seen in FIG. 19 at 1900. Here the attributes derived include the message language, estimates for the user's fluency level in the language and education level, sentiment and a behavior type. As discussed above, additional or alternate information such as IP address, physical location, and other $3^{rd}$ party data (e.g., credit scores, age, job history, etc.) can be included in this summary pane. Ultimately, the actions derived from the insights are listed in the bottom of the summary panes. For example, when the insight is "interested in learning more" the action may be to continue messaging with a template that provides more information. In contrast when the insight is to "propose a meeting" the action may be to continue messaging with an introduction of a representative and a schedule meeting template.

Returning to FIG. 12, after insights have been extracted, user meta-data and response insights are sent to the Inference Engine. The Inference Engine combines statistical decisions with rule-based business logic to determine the best set of actions to take. A determination is made whether there is an action conflict (at 1250) or unsatisfactory confidence in action decisions. Manual review may be needed when in both cases. (at 1270). Otherwise, the actions may be executed by the system (at 1260).

Returning to FIG. 10, after the response has been processed, a determination is made whether to deactivate the lead (at 1075). Such a deactivation may be determined as needed when the lead requests it. If so, then the lead is deactivated (at 1090). If not, the process continues by determining if the campaign for the given lead is complete (at 1080). The campaign may be completed when all objectives for the lead have been met, or when there are no longer messages in the series that are applicable to the given lead. Once the campaign is completed, the lead may likewise be deactivated (at 1090).

However, if the campaign is not yet complete, the process may return to the delay period (at 1020) before preparing and sending out the next message in the series (at 1030). The process iterates in this manner until the lead requests deactivation, or until all objectives are met. This concludes the main process for a comprehensive messaging campaign. Attention will now be focused on the sub-processes that further enhance message classification.

Figure 20:
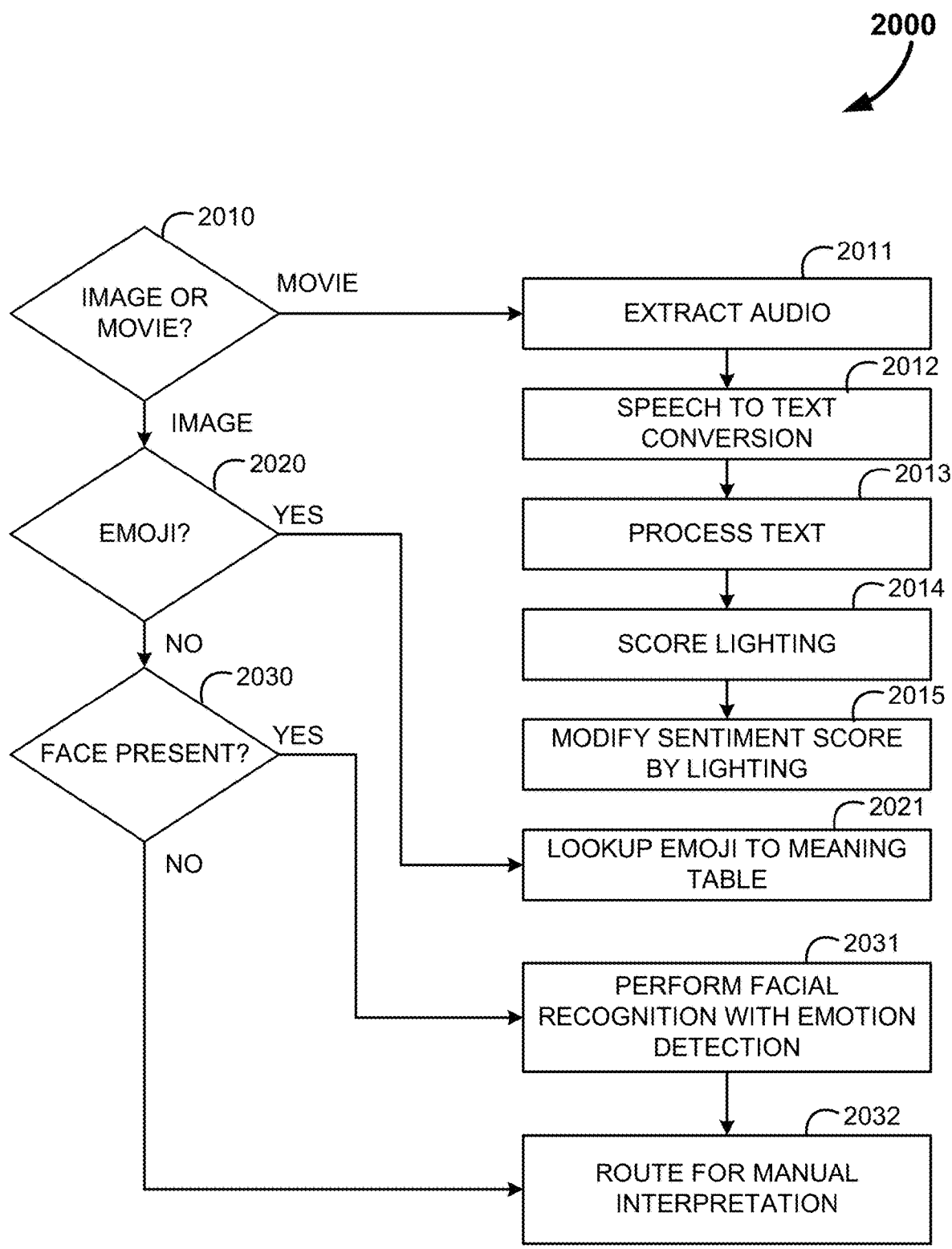
FIG. 20 is an example flow diagram for the process of analyzing non-text message elements, in accordance with some embodiment.

Particularly, turning to FIG. 20, a process for analyzing non-text message content is provided, at 2000. This process is invoked when there are message elements that are not standard text information. As bandwidth increases, and the availability of digital images is ubiquitous, the ability and ease of embedding image or video information into a message likewise increases. Additionally, in an effort to include more context into a message, many people rely more upon emoticons than previously did.

While these features allow for a more context rich message, these elements have proven difficult for machine learning algorithms to handle. In this example process the system initially undergoes a query to identify if the non-textual element is a movie or an image (at 2010). The file type or extension may be utilized to determine if the element is a video or image. If the element is a movie, the system may separate out any audio elements to the video (at 2011) and then perform a speech to text conversion (at 2012). The textual output can then be run though the same textual analysis described above (at 2013). Lighting of the video image frames may also be scored (at 2015) as lower lighting tends to indicate a reduced sentiment, as it is associated with intimacy, fear, and melancholy. Brighter frames may indicate happiness and other positive emotions. As such the lighting score may be utilized to modulate the sentiment score (at 2015). Likewise, embedded pure audio files may also be extracted, converted to text, and processed in a similar manner.

If it was determined that the file is an image, the system may make a determination if the image is an emoji/emoticon (at 2020). This may be performed by first looking at the image pixel size, as emoticons fall within standard sizes for fitting into text lines. If the image is within the parameters of an emoticon's size constraints, the emoticon may be compared against a repository of emoticons (at 2021). This repository may be a database that includes known emoji's, each annotated with a meaning. For example, a "party horn" emoji may indicate celebration and joy. A "poo" emoji may indicate disapproval, disappointment or disgust. These annotated meanings may be added to the classification of the document being processed.

If the image is not an emoji, but rather a larger complicated image, the system may determine if there is a face present (at 2030). If a face is present the face may be analyzed with standard facial recognition tools, and emotion in the face may be extracted (at 2031). Likewise, if there is text in the image, as is common in meme type images, this text may be extracted and processed as described above.

Regardless of facial or text presence in the image, ultimately these elements are routed to a person for manual interpretation (at 2032). As noted previously, images in signature bars, or other "standardized" images present in all messages may be ignored as they provide little additional information. It is also possible for the image metadata to be stored along with the results of manual interpretation. This way, as images are received in subsequent messages, they may be compared against previously received images. This reduces the number of images requiring manual interpretation, and speeds the analysis. The classification for images are done using the deep neural network algorithms (convolutional neural networks, for example) that are also used for text classification.

Figure 21:
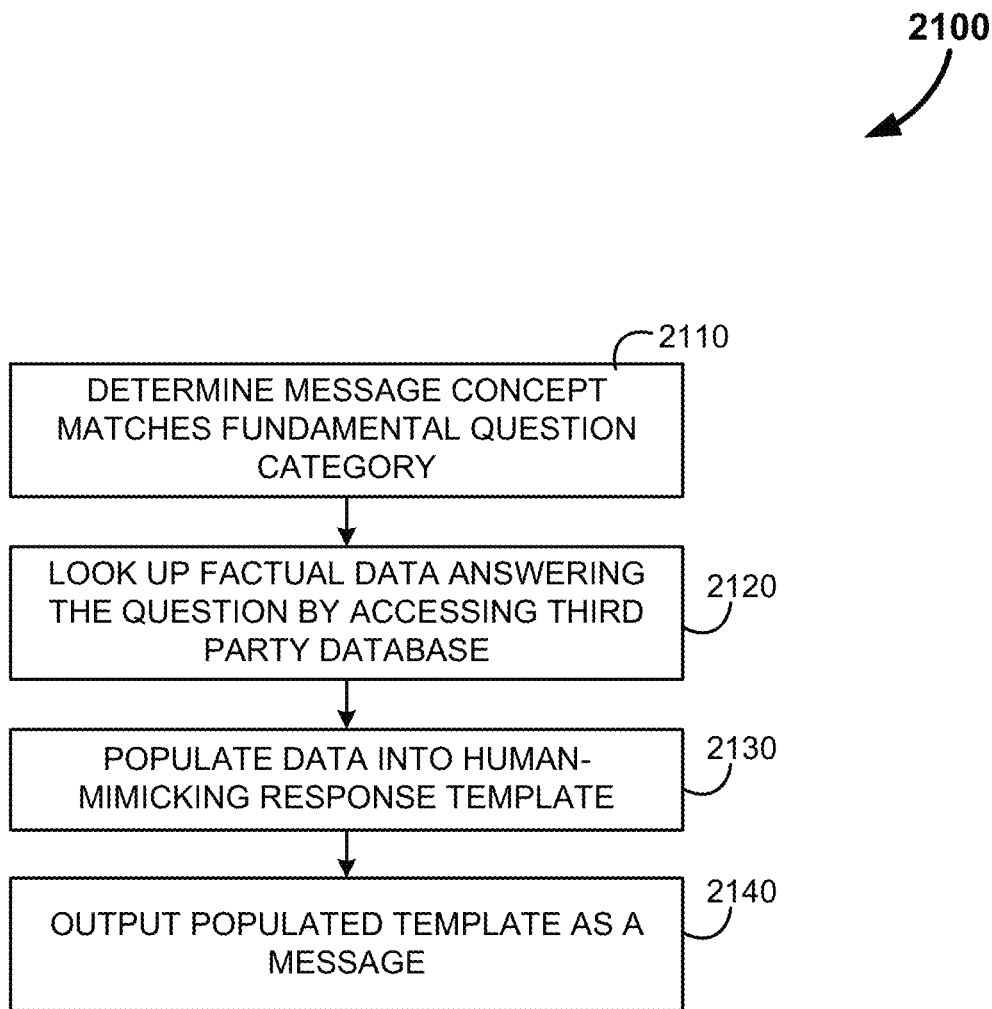
FIG. 21 is an example flow diagram for the process of simple question response, in accordance with some embodiment.

Moving on, FIG. 21 provides an example process for simple message handling, at 2100. In this example process, the first step is to determine if the message concept matches a fundamental question category (at 2110). These fundamental questions are uploaded by a campaign manager and linked back to an external dataset which includes information answering the question. As noted before, the campaign manager provides a training question, which may be combined with similar training questions belonging to the same category as the question posed by the campaign manager. For example, the campaign manager may submit the following training question: "what are your store hours?". This question belongs to the category related to "store hours". The campaign manager links this training question to a listing of hours on the store's website. The system may then pull up other questions that are known to fulfill the category of "store hours" and likewise link them to the provided dataset with the answer. An example of such an alternate known question could include: "when are you open?" or "When can I come in?". After compiling this expanded set of training questions, the system may perform a synonym replacement in the training set to generate an even greater expanded set of training questions. By replacing words in each training question with all known synonyms, it is possible to generate many hundreds or even thousands of permutations. Each of these permutations may be leveraged by the AI model to determine when a message comes in whether it relates to a fundamental question. In addition, the system uses vector similarity and instance classification approaches. In the vector similarity approach, neural network, LSI and other word embedding approaches such as random projection are used to learnt the semantic vector representation of first the words, then individual questions, then question categories and finally the input from actor in online mode. The input semantic vector is compared to the semantic vector of the question categories and the most similar question category is chosen as the matched question if the similarity value (as measured by dot product and other approaches) is more than the minimum similarity value between all pairs of the variations in the question category. In the machine learning approach, we treat each question category as a class and each variation within the category as an instance labeled to belonging to that class and apply all the machine learning algorithms listed in the previous section to develop a model that is trained and applied in online mode.

It should be noted that simple questions are mostly context generic, and represent a relatively small percentage of the messages received. The AI model may utilize the training questions to populate a definition table including an ID for each question, name of the question category, description, active status, insert date and last modified date.

Once the message question has been determined to belong to a category of simple question, the factual data answering the question may be looked up in accordance with the training provided from the campaign manager (at 2120). Again, this typically includes looking up the factual data in an external third party dataset. The recovered data is then populated into a human-mimicking response template (at 2130) which is output as a message to the lead (at 2140) without the need for any human intervention. Examples of simple questions include business hours, business location inquiry, "how are you" inquiries, questions pertaining to contacting a specific employee/department/extension, questions regarding inventory availability, etc. In addition, we also use the vector similarity and machine learning approach described above. It should be noted the response template may be a singular template, multiple templates that can be used interchangeably, or a template with variable features that may be pseudo-randomly replaced to ensure the response is as "human sounding" as possible. For example, if the message asks "how are you" the response template could include "[Salutation], I [verb] [status] today." The salutation could be randomly, or pseudo-randomly selected from the following: "Thanks for asking", "Hi", "Hey", "You are so sweet" or the like. The verb could include the following: "am", "am feeling", "feel", etc. The status could include: "happy", "fine", "great", etc. This allows a total of at least 36 possible outputs for this question. This is important since the lead may send more than one simple question over the course of a message exchange, and having a static answer may appear "robotic" to the lead over time.

Figure 22:
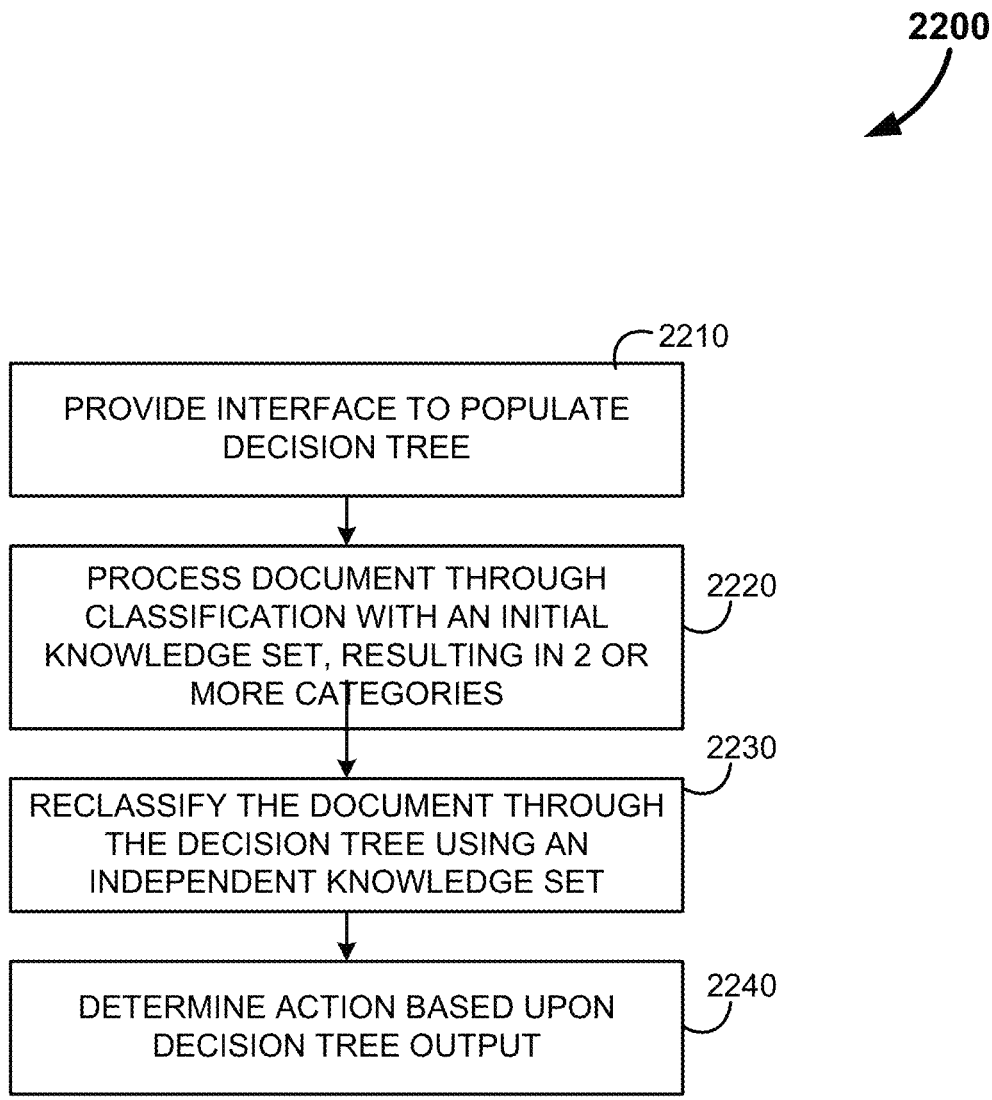
FIG. 22 is an example flow diagram for the process of populating and utilizing a decision tree tool for complex classification efforts, in accordance with some embodiment.

Turning now to FIG. 22, an example process is presented for the generation and leveraging of decision trees to infer the best action to take, shown at 2200. Initially the campaign manager or other administrator is provided a Tree Builder interface for populating the decision tree (at 2210) (see section [00106]). A document is processed through a standardized classification with an initial knowledge set (at 2220). In the case of difficult documents, this may result in a classification for the document with two or more categories attributed to the document. This document is then reclassified through the decision tree using a different dataset and different classification thresholds (at 2230). Each decision tree can either produce a confident classification or indicate that human review is required via Training Desk. Confident classifications apply when each decision node in a classification tree meets or exceeds the node's confidence threshold. A single decision tree can produce a single classification describing the best action for the system to apply. Decision trees are run within the Inference Engine to infer the best action to take. Lastly, the action for the document is determined based upon the decision tree output (at 2240).

IV. System Embodiments

Figure 23A:
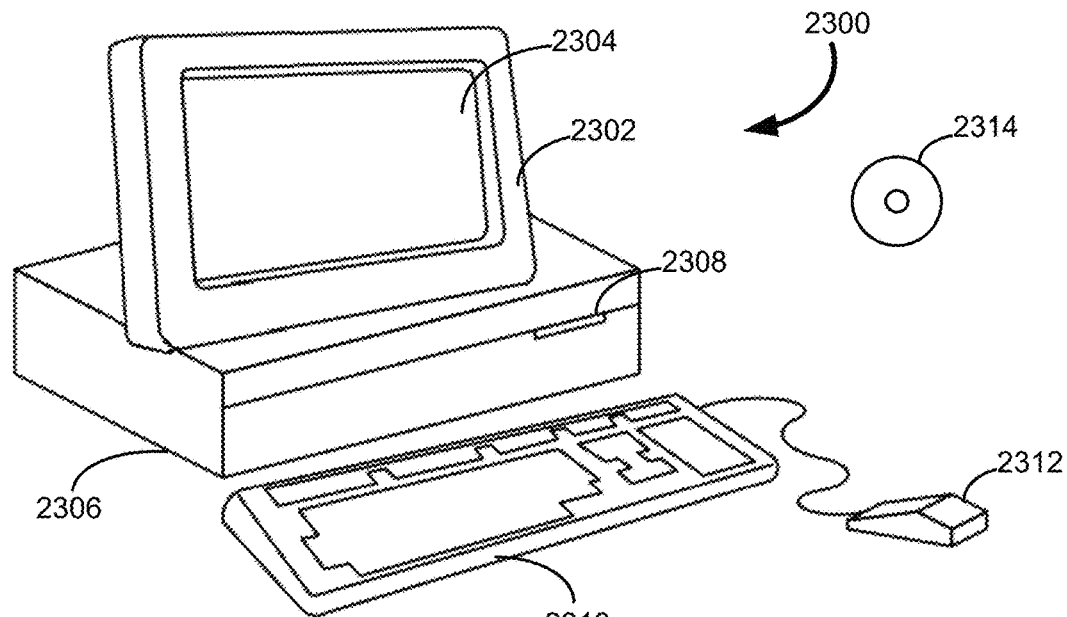
FIGS. 23A and 23B are example illustrations of a computer system capable of embodying the current invention.
Figure 23B:
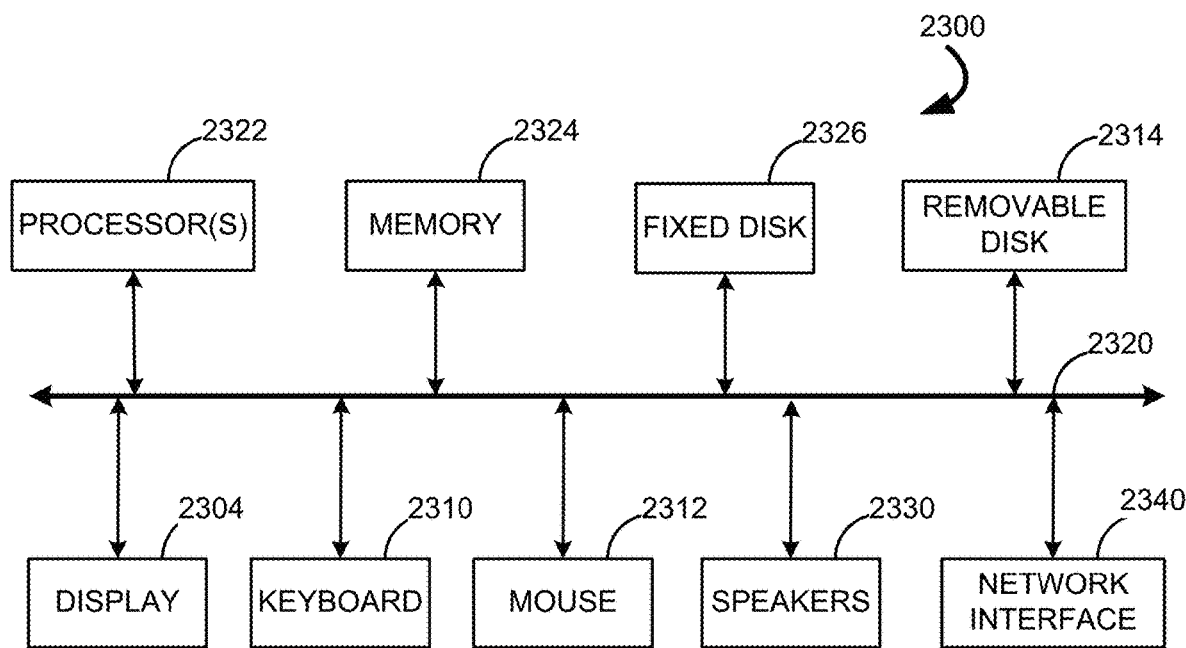

Now that the systems and methods for the campaign generation, message classification, and response to messages have been described, attention shall now be focused upon systems capable of executing the above functions. To facilitate this discussion, FIGS. 23A and 23B illustrate a Computer System 2300, which is suitable for implementing embodiments of the present invention. FIG. 23A shows one possible physical form of the Computer System 2300. Of course, the Computer System 2300 may have many physical forms ranging from a printed circuit board, an integrated circuit, and a small handheld device up to a huge super computer. Computer system 2300 may include a Monitor 2302, a Display 2304, a Housing 2306, a Disk Drive 2308, a Keyboard 2310, and a Mouse 2312. Disk 2314 is a computer-readable medium used to transfer data to and from Computer System 2300.

FIG. 23B is an example of a block diagram for Computer System 2300. Attached to System Bus 2320 are a wide variety of subsystems. Processor(s) 2322 (also referred to as central processing units, or CPUs) are coupled to storage devices, including Memory 2324. Memory 2324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2326 may also be coupled bi-directionally to the Processor 2322; it provides additional data storage capacity and may also include any of the computer-readable media described below. Fixed Disk 2326 may be used to store programs, data, and the like and is typically a secondary storage medium (such as a hard disk) that is slower than primary storage. It will be appreciated that the information retained within Fixed Disk 2326 may, in appropriate cases, be incorporated in standard fashion as virtual memory in Memory 2324. Removable Disk 2314 may take the form of any of the computer-readable media described below.

Processor 2322 is also coupled to a variety of input/output devices, such as Display 2304, Keyboard 2310, Mouse 2312 and Speakers 2330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2322 optionally may be coupled to another computer or telecommunications network using Network Interface 2340. With such a Network Interface 2340, it is contemplated that the Processor 2322 might receive information from the network, or might output information to the network in the course of performing the above-described classification and message processing. Furthermore, method embodiments of the present invention may execute solely upon Processor 2322 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for generating a communication editor dashboard comprising:
   receiving a message;
   performing natural language processing on the message to divide the message into component parts, wherein each component part has a discrete meaning;
   analyzing the message for sentiment;
   derive at least one insight and an estimate of education level from the component parts;
   calculating a confidence score for each of the at least one insight;
   generating actions based on the at least one insight and the estimated education level;
   displaying in a first pane the message with each of the component parts overlaid with a different color; and
   displaying in a second pane the at least one insight, the confidence score associated with each insight, the sentiment and the actions.

2. The method of claim 1, further comprising deriving additional attributes for a lead using the component parts.

3. The method of claim 2, wherein the additional attributes include language used, and language fluency.

4. The method of claim 3, wherein the additional attributes further include a behavior analysis.

5. The method of claim 2, wherein the additional attributes are tracked over time.

6. The method of claim 2, wherein the additional attributes are collected from third party sources.

7. The method of claim 6, wherein the additional attributes are channel dependent.

8. The method of claim 7, wherein the additional attributes include at least one of IP address, cellular tower location and routing.

9. The method of claim 1, further comprising layering mouse-over fields on the displayed color overlaid components.

10. The method of claim 9, wherein the mouse-over fields display the insight generated from the component and the confidence score for that insight when a user moves a cursor over a given mouse-over field.

11. A computer program product on a non-transitory computer medium, which when executed on a computer system causes the following steps to occur:
- receiving a message;
- performing natural language processing on the message to divide the message into component parts, wherein each component part has a discrete meaning;
- analyzing the message for sentiment;
- derive at least one insight and an estimate of education level from the component parts;
- calculating a confidence score for each of the at least one insight;
- generating actions based on the at least one insight and the estimated education level;
- displaying in a first pane the message with each of the component parts overlaid with a different color; and
- displaying in a second pane the at least one insight, the confidence score associated with each insight, the sentiment and the actions.

12. The computer program product of claim 11, further completing the steps of deriving additional attributes for a lead using the component parts.

13. The computer program product of claim 12, wherein the additional attributes include language used, and language fluency.

14. The computer program product of claim 13, wherein the additional attributes further include a behavior analysis.

15. The computer program product of claim 12, wherein the additional attributes are tracked over time.

16. The computer program product of claim 12, wherein the additional attributes are collected from third party sources.

17. The computer program product of claim 16, wherein the additional attributes are channel dependent.

18. The computer program product of claim 17, wherein the additional attributes include at least one of IP address, cellular tower location and routing.

19. The computer program product of claim 11, further completing the steps of layering mouse-over fields on the displayed color overlaid components.

20. The computer program product of claim 19, wherein the mouse-over fields display the insight generated from the component and the confidence score for that insight when a user moves a cursor over a given mouse-over field.

* * * * *